US012153430B2

(12) United States Patent
Michini et al.

(10) Patent No.: US 12,153,430 B2
(45) Date of Patent: Nov. 26, 2024

(54) ADJUSTING A UAV FLIGHT PLAN BASED ON RADIO FREQUENCY SIGNAL DATA

(71) Applicant: Skydio, Inc., San Mateo, CA (US)

(72) Inventors: Bernard J. Michini, San Francisco, CA (US); Fabien Blanc-Paques, San Francisco, CA (US); Logan Kaminski, San Francisco, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 18/330,942

(22) Filed: Jun. 7, 2023

(65) Prior Publication Data

US 2023/0400853 A1 Dec. 14, 2023

Related U.S. Application Data

(63) Continuation of application No. 17/478,090, filed on Sep. 17, 2021, now Pat. No. 11,709,491, which is a continuation of application No. 15/636,885, filed on Jun. 29, 2017, now Pat. No. 11,150,654.

(60) Provisional application No. 62/357,294, filed on Jun. 30, 2016.

(51) Int. Cl.
*G08G 5/00* (2006.01)
*G01S 1/02* (2010.01)
*G05D 1/00* (2024.01)
*H04B 17/318* (2015.01)
*B64U 10/14* (2023.01)
*B64U 101/26* (2023.01)
*B64U 101/30* (2023.01)
*B64U 101/64* (2023.01)

(52) U.S. Cl.
CPC ............ *G05D 1/0088* (2013.01); *G01S 1/024* (2013.01); *G05D 1/0094* (2013.01); *G08G 5/006* (2013.01); *G08G 5/0069* (2013.01); *H04B 17/318* (2015.01); *B64U 10/14* (2023.01); *B64U 2101/26* (2023.01); *B64U 2101/30* (2023.01); *B64U 2101/64* (2023.01); *B64U 2201/10* (2023.01); *G08G 5/0034* (2013.01)

(58) Field of Classification Search
CPC .. G05D 1/0088; G05D 1/0094; B64C 39/024; G01S 1/024; G08G 5/006; G08G 5/0069; G08G 5/0034; H04B 17/318; B64U 2101/00; B64U 10/14; B64U 2101/26; B64U 2101/30; B64U 2101/64
See application file for complete search history.

(56) References Cited

U.S. PATENT DOCUMENTS

| | | | |
|---|---|---|---|
| 8,744,379 B1 | 6/2014 | Sung et al. | |
| 9,513,635 B1 * | 12/2016 | Bethke | ............... G05D 1/0094 |
| 9,536,149 B1 * | 1/2017 | Cesarano | ............. G05D 1/0094 |
| 9,537,561 B1 * | 1/2017 | Kotecha | ................. H04W 8/00 |
| 9,696,430 B2 | 7/2017 | Park et al. | |
| 9,798,322 B2 | 10/2017 | Bachrach et al. | |
| 11,150,654 B2 | 10/2021 | Michini et al. | |
| 2013/0328725 A1 | 12/2013 | Wuoti et al. | |

(Continued)

Primary Examiner — Harry Y Oh

(57) ABSTRACT

A flight plan of an unmanned aerial vehicle (UAV) for inspecting a structure that includes an RF transmitter is received. The structure is surveyed based on the flight plan to collect RF signal data. An RF map associated with the structure is generated based on the collected RF signal data. The flight plan is adjusted based on the generated RF map to account for detected RF signal strengths. The UAV is navigated according to the adjusted flight plan.

18 Claims, 12 Drawing Sheets

(56) References Cited

U.S. PATENT DOCUMENTS

| | | |
|---|---|---|
| 2015/0380815 A1 | 12/2015 | Boutayeb et al. |
| 2016/0117932 A1 | 4/2016 | Park et al. |
| 2016/0161258 A1 | 6/2016 | Magson et al. |
| 2016/0260328 A1 | 9/2016 | Mishra et al. |
| 2016/0330771 A1 | 11/2016 | Tan |
| 2017/0013478 A1* | 1/2017 | Singh ................. H04W 4/30 |
| 2018/0025649 A1 | 1/2018 | Contreras et al. |

* cited by examiner

ADJUSTING A UAV FLIGHT PLAN BASED ON RADIO FREQUENCY SIGNAL DATA

CROSS-REFERENCE TO RELATED APPLICATION(S)

This application is a continuation of U.S. patent application Ser. No. 17/478,090, filed Sep. 17, 2021, which is a continuation of U.S. patent application Ser. No. 15/636,885, filed Jun. 29, 2017, which claims the benefit of U.S. Provisional Patent Application No. 62/357,294, filed Jun. 30, 2016, the entire disclosures of which are hereby incorporated by reference.

TECHNICAL FIELD

The disclosure generally relates to automatically piloting unmanned aerial vehicles.

BACKGROUND

Unmanned aerial vehicles (UAVs) are becoming more widely used to perform tasks that are typically done by teams of people. For example, UAVs are used for inspecting buildings, crops, erosion of rivers and coastlines, delivery of goods, and many other tasks. A task that UAVs might be particularly useful for is inspection of tall and/or dangerous structures. For example, a UAV might be particularly well-suited for inspecting (e.g., taking photographs and/or other sensor data) radio towers, RF transmitter towers, and other tall objects that are difficult for people to inspect without risking human life. However, UAV's can often be expensive and damaging a UAV during an inspection mission can cost the UAV operator a lot of money in repairs and lost flight time.

SUMMARY

In some implementations, a UAV flight system can dynamically adjust UAV flight operations based on radio frequency (RF) signal data. For example, the flight system can determine an initial flight plan for inspecting a RF transmitter and configure a UAV to perform an aerial inspection of the RF transmitter. Once airborne, the UAV can collect RF signal data and the flight system can automatically adjust the flight plan to avoid RF signal interference and/or damage to the UAV based on the collected RF signal data. In some implementations, the UAV can collect RF signal data and generate a three-dimensional received signal strength map that describes the received signal strength at various locations within a volumetric area around the RF transmitter. In some implementations, the UAV can collect RF signal data and determine whether a RF signal transmitter is properly aligned.

Implementations described herein provide at least the following advantages. A UAV can perform inspections of dangerous objects without risking human life. The UAV can automatically avoid damage to the UAV by deviating from an initial flight plan to avoid areas of high RF signal strength. The UAV can collect sensor data that allows the UAV operator to inspect the configuration and/or alignment of a RF transmitter.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

Like reference numbers and designations in the various drawings indicate like elements.

DETAILED DESCRIPTION

System Overview

Figure 1:
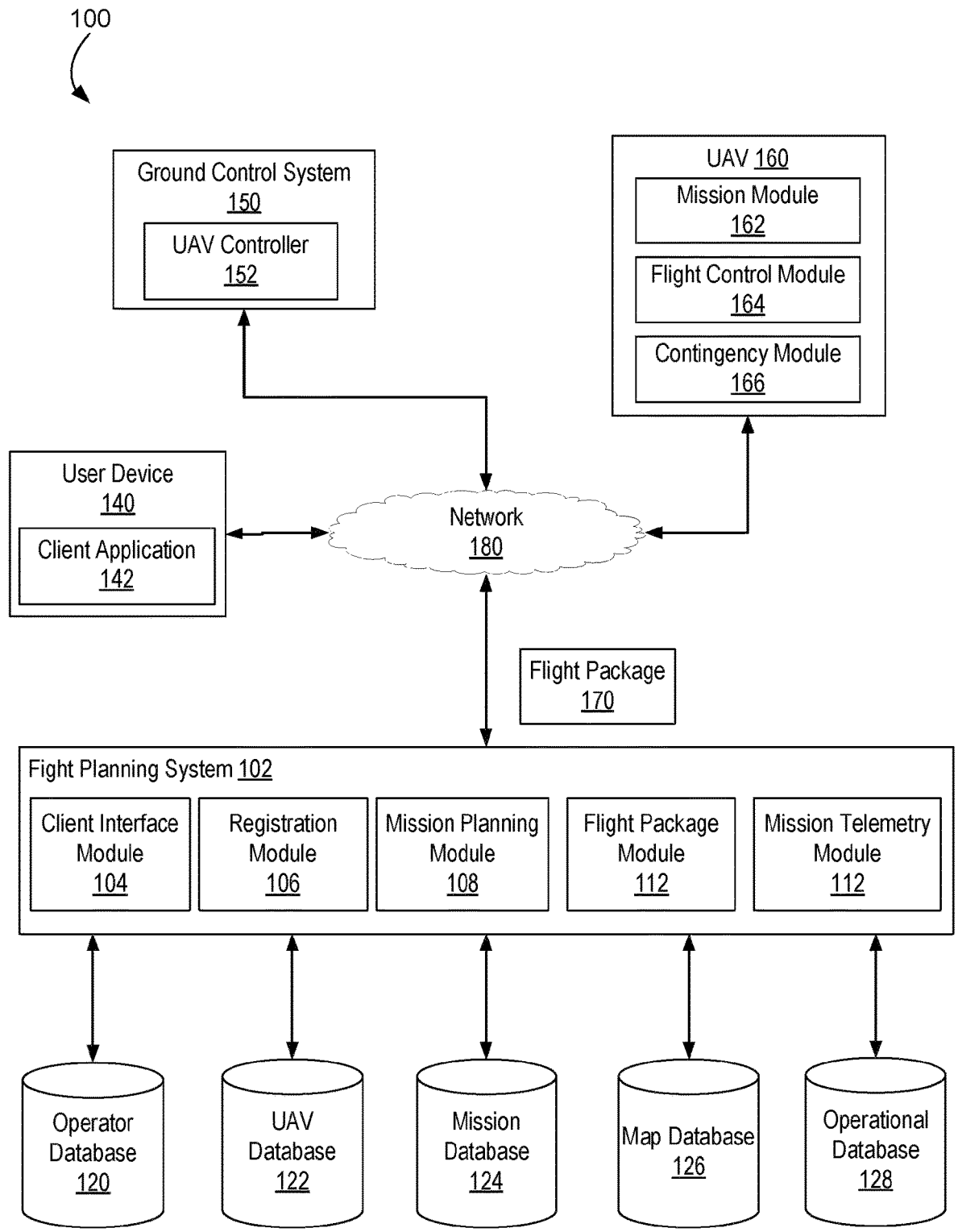
FIG. 1 is a block diagram of an example UAV flight system.

FIG. 1 is a block diagram of an example unmanned aerial vehicle (UAV) flight system 100. For example, UAV flight system 100 can be a system of various computing devices, databases, and UAVs that include hardware and software configured to perform, control, and manage UAV flight operations. System 100 can be configured, as needed, to perform mission-specific flight operations in support of a mission-specific goal, such as aerial inspection and/or aerial delivery.

In some implementations, system 100 can include flight planning system 102. For example, flight planning system 102 can be a system of one or more computers, and/or software executing on a system of one or more computers for planning and/or controlling the operation of one or more unmanned aerial vehicles. Flight planning system 102 can be a system of one or more processors, graphics processors, logic circuits, analog circuits, associated volatile and/or non-volatile memory, associated input/output data ports, power ports, etc., and/or one or more software processing executing one or more processors or computers. The flight planning system 102 may receive, store, generate, and maintain flight operation information associated with a UAV, UAV operators and/or UAV missions using various software modules (e.g., modules 104-112).

In some implementations, flight planning system 102 can include client interface module 104. For example, client interface module 104 can provide client interfaces for UAV operators to interact with flight planning system 102. The UAV operator can, for example, interact with client software application 142 on user device 140 (e.g., a laptop computer, desktop computer, tablet computer, etc.) to connect to client interface module 104 of flight planning system 102 through network 170 to register with flight planning system 102, to submit flight requests and/or mission requests, and/or to receive flight packages, including mission-specific flight plans and/or UAV programming.

For example, network 180 can be a wide area network, local area network, wireless network, cellular network, and/or the Internet. Network 180 can be a peer-to-peer (e.g., ad-hoc) network implemented using near field communication technologies such as Bluetooth, peer-to-peer Wi-Fi, and/or other wireless peer-to-peer networking technologies. In some implementations, network 180 can represent a wired peer-to-peer connection, such as a universal serial bus (USB) connection between the devices connected to network 180. For example, flight planning system 102, user device 140, or ground control system 150 may connect to one or more UAVs 160 through network 180 using a wired (e.g., USB, Ethernet, etc.) or wireless (e.g., Wi-Fi, Bluetooth, etc.) connection to configure or program the UAVs 160 to fly a mission, as described further below. Flight planning system 102, user device 140, and/or ground control system 150 may connect to each other through network 180 using a wired (e.g., USB, Ethernet, etc.) or wireless (e.g., Wi-Fi, Bluetooth, etc.) connection to exchange mission requests, flight approvals, flight packages, and/or other information, as described further below.

In some implementations, client application 142 can be a web browser and client interface module 112 can be a web server. For example, client interface module 112 can send web client user interfaces (e.g., web pages, HTML, JavaScript, etc.) to client application 142 so that the UAV operator can enter information into the web client interfaces describing the UAV operator, the UAV operated by the UAV operator, and/or the mission the UAV operator would like to fly.

In some implementations, client application 142 can be a native client (e.g., built specifically for the operating system or hardware configuration of user device 140) and client interface module 112 can be a server that exchanges data with client application 142 using standard network protocols. For example, client application 142 can establish a communication session with so that the UAV operator can enter information into a graphical user interface of client application 142 describing the UAV operator, the UAV operated by the UAV operator, and/or the mission the UAV operator would like to fly and client application 142 can send the information to client interface module 104 for processing by flight planning system 102.

In some implementations, flight planning system 102 can include registration module 106. For example, before a UAV operator can fly a UAV mission using flight system 100, a UAV operator can register with flight planning system 102 through registration module 106. For example, when the UAV operator registers with flight planning system 102 using client application 142, the UAV operator can provide input to client application 142 describing UAV operator information, including an identifier for the UAV operator (e.g., a company identifier, a pilot identifier, etc.), licensing information (e.g., UAV pilot's license or certification), contact information (e.g., contact person, telephone number, address, etc.), and/or any flight restrictions for the UAV operator (e.g., regional restrictions, UAV size restrictions, UAV type restrictions, altitude restrictions, etc.). In some implementations, the UAV operator information can include identification (e.g., registration number, make, model, serial number, type, etc.) of each the UAVs that the UAV operator intends to fly. Client application 142 can send the UAV operator information to registration module 106 (e.g., through client interface module 104). Upon receipt of the UAV operator information, registration module 106 can store the UAV operator information in operator database 120. The UAV operator information stored in UAV operator database 120 may include different or additional UAV operator information, as may be described herein below.

In some implementations, flight planning system 102 (e.g., registration module 106) can store UAV information in UAV database 122. For example, UAV database 122 can include records for each UAV operated (e.g., flown) by system 100. UAV database 122 can be populated with UAV information provided by UAV operators (e.g., during registration) using client application 142 and client interface module 104, for example.

In some implementations, UAV configuration database 122 can be populated by flight planning system 102 based on data received from UAV manufacturers and/or various network resources (e.g., manufacturer's servers, UAV operator servers, etc.) For example, when a UAV operator submits a registration request, a mission request, or a flight request to flight planning system 102, the UAV operator can identify one or more UAVs that will be used to perform flight missions. Flight planning system 102 can obtain (e.g., from network resources, from the UAV operator, etc.) the specifications for the identified UAV and store the UAV specifications in UAV database 122. A UAV record in UAV database 122 can include an identifier for the UAV. For example, the UAV identifier can be a registration number assigned to the UAV by a governmental agency (e.g., the Federal Aviation Administration) or an identifier assigned to the UAV by flight planning system 102. The UAV record can include information describing the specifications of the UAV, such as make, model, serial number, configuration type (e.g., multirotor, fixed wing, etc.), weight, payload capacity, top speed, maximum altitude, maximum range, contingency features (e.g., parachute) and/or other UAV specifications, as may be described herein.

In some implementations, flight planning system 102 can include mission planning module 108. For example, mission planning module 108 can determine mission parameters, including flight plans and/or other mission parameters, based on mission requests (e.g., flight requests) submitted by a UAV operator through client interface module 104 using client application 142. For example, the mission parameters specified in the mission request can include the type of mission (e.g., inspection, delivery), the target of the mission (e.g., a specific building, location, infrastructure element, natural feature, etc.), a flight plan, a description of the UAV performing the mission, and/or other mission parameters. When the mission parameters are received, flight planning system 102 can store the mission parameters in mission database 124.

In some implementations, mission planning module 108 can generate mission parameters based on a received mission request. For example, while a mission request submitted by a UAV operator may include a full definition of the mission parameters for the requested mission (e.g., type of mission, mission target, flight plan, UAV designation, etc.), some mission requests may not include full definition of the mission parameters required for the requested mission. For example, some mission requests may only define the type of mission and the mission target. When a mission request does not provide a full definition of the mission parameters for the mission, mission planning module 108 can automatically determine the missing mission parameters for the mission. For example, when the UAV operator provides a mission request that only identifies the mission type, mission target, mission timeframe, and UAV designation, mission planning module 108 can automatically determine a flight plan that will allow the designated UAV to perform the identified mission type with respect to the mission target in the identified mission timeframe. For example, if the mission type is an inspection mission, mission planning module 108 can determine a flight path that allows the UAV to inspect the mission target (e.g., a building) within the identified mission timeframe. For example, if the mission type is a delivery mission, mission planning module 108 can determine a flight path that allows the UAV to make a delivery to the mission target (e.g., address) within the identified mission timeframe.

In some implementations, mission planning module 108 can automatically determine flight paths for requested missions based on data stored in map database 126. For example, map database 126 can include map data, including geospatial descriptions (e.g., location, configuration, size, dimensions, height, layout, etc.) of objects that might be the subject of a UAV mission. For example, the objects may include natural features (e.g., geological features, geographical features, etc.) and/or man-made features (e.g., buildings, pipelines, bridges, radio towers, RF transmitter towers, etc.). Mission planning module 108 can use the map data to determine flight paths for inspecting the objects described by the map data, making a delivery to the objects described by the map data, and/or avoiding the objects described by the map data so that the UAV does not crash into the objects while in flight.

In some implementations, the map data stored in map database 126 can be received from UAV operators in mission requests. For example, when a UAV operator submits a mission request to mission planning module 108, the request can include map data describing the target of the requested mission. Mission planning module 108 can store the received map data in map database 126. Alternatively, mission planning module 108 can obtain the map data for the object identified as the mission target in a mission request from one or more network resources (e.g., various Internet services, a map vendor, etc.). Mission planning module 108 can store the obtained map data in map database 126.

In some implementations, mission planning module 108 can store the mission parameters for each flight mission request in mission database 124. For example, the mission parameters can include an identifier for a UAV performing the mission. If additional information about a UAV is needed, mission planning module 108 can look up UAV specifications and other data for the identified UAV in UAV database 122. The mission parameters can include an identifier for the UAV operator controlling the mission. If additional information about a UAV operator is needed, mission planning module 108 can look up the UAV operator information and other data for the identified UAV operator in operator database 120.

In some implementations, the mission parameters can include a flight plan. The flight plan can be defined by a UAV operator or automatically determined by mission planning module 108, as described above. For example, the flight plan can include a flight schedule that defines a start time (e.g., date and time), an end time (e.g., date and time), and/or a duration for the mission. The flight plan can include a flight path for each mission. For example, the flight path can include a take-off location, a landing location, and waypoints (e.g., geospatial locations, including latitude, longitude, altitude) for navigating between the take-off location and the landing location.

The flight plan can include one or more geofences that define geospatial areas that the UAV must stay within or stay outside of when flying the mission. For example, the flight plan can include a first geofence that defines a geospatial area (e.g., approved airspace) that the UAV must stay within while conducting the mission. The first geofence can, for example, define a geospatial area that contains the take-off location, landing location, and all waypoints defined for the flight plan. The flight plan can include a second geofence that defines a geospatial area (e.g., restricted airspace) that the UAV must not go within. For example, the second geofence can be generated to keep the UAV out of populated areas, military installations, and/or other protected areas (e.g., fuel storage sites, nuclear reactors, etc.).

The flight plan can include contingency data for the mission. For example, the contingency data can define contingency events (e.g., motor failure, control failure, deviation from flight path, exiting geofence, etc.) and maneuvers to perform in response to a detected contingency event (e.g., fly to emergency landing zones, follow emergency flight paths, deploy parachute, etc.).

In some implementations, the mission parameters can describe special payloads for the UAV to perform the mission. For example, the UAV operator can define special UAV payloads required for performing the UAV mission in the mission request received by mission planning module 108. For example, special payloads can include cameras, sensors, payload carrying apparatus, etc., configured on the UAV for performing a specific mission. For example, if the UAV mission is to perform a visual inspection of a natural disaster, then the special payload may include a high definition camera for taking pictures of the natural disaster. If the UAV mission is to detect thermal emissions, electromagnetic emissions, gas leaks, or other types of thermal, radiological, or chemical leaks, the special payload can include sensors for detecting thermal, radiological, or chemical leaks.

In some implementations, after determining the mission parameters for a mission request and storing the mission parameters in mission database 124, mission planning module 108 can determine whether the mission parameters conflict with other pending missions in mission database 124. For example, flight planning system 102 can be configured to manage the airspace needed for UAV missions. Therefore, after mission planning module 108 determines a flight plan for a requested mission, mission planning module 108 can determine whether the schedule for the requested mission conflicts with other flight missions that have flight plans in the same airspace at the same time as the requested mission. If no other missions are scheduled at the same time and same airspace as the requested mission, then mission planning module 108 can authorize the requested mission, reserve the necessary airspace, and indicate in the mission record in mission database 124 that the requested mission is approved and/or scheduled. If another mission is scheduled at the same time and same airspace as the requested mission, then mission planning module 108 can notify the requesting UAV operator (e.g., through client application 142) that the airspace needed for the requested mission is unavailable (e.g., has already been reserved) at the requested time and indicate in the mission record in mission database 124 that the requested mission is not approved and/or not scheduled. The UAV operator can then request an alternative time for the mission until an appropriate time for the requested mission is determined.

In some implementations, flight planning system 102 can include flight package module 112. For example, after mission planning module 108 determines the mission parameters for a received mission request and approves the requested mission, mission planning module 108 can send the mission parameters to flight package module 112 for packaging into flight package 170 for delivery to ground control system 150 and/or UAVs 160. For example, flight package 170 can include one or more flight plans. Each flight plan can include a flight schedule (e.g., start time, end time), start location, destination location, waypoints for navigating from the start location to the destination location, contingency event definitions, contingency operations for each contingency event. Flight package 170 can include operator (e.g., pilot) information, such as the name of the operator, the operator's employer, the operator's license information (e.g., including UAV ratings), etc. Flight package 170 can include UAV information, such as the UAV type, payload, model, size, operating range, and/or other UAV specifications describing the UAV that will perform the mission described by the flight package. For example, a UAV operator can use UAV controller application 152 on ground control system 150 to program and/or control one or more UAVs 160 according to the data in flight package 170. Alternatively, flight planning system 102 can send flight package 170 directly to one or more UAVs 160 to program the UAVs 160 according to the flight package 170. UAVs 160 can then, in some implementations, automatically pilot themselves according to the flight plans and/or other data in flight package 170.

In some implementations, system 100 can include one or more UAVs 160. For example, UAV 160 can include mission module 162. For example, mission module 162 can process flight package 170 to determine the mission parameters for a scheduled mission or flight, including the flight plan, contingency conditions (e.g., events that trigger a contingency maneuver), and/or contingency maneuvers for the mission. Mission module 162 can, for example, determine the flight plan for the mission based on the flight plan data in flight package 170. Mission module 162 can send the flight plan (e.g., start location, waypoints, etc.) to flight control module 164.

In some implementations, UAV 160 can include flight control module 164. For example, flight control module 164 can use the flight plan data to cause UAV 160 to automatically navigate from a take-off location, to one or more waypoints, and to the landing location defined by the flight plan automatically based on data provided by various motion sensors and/or location subsystems of the UAV. For example, flight control module 164 can determine the current location of UAV 160 based on various wireless signals (e.g., global navigational satellite signals, radio access technology signals, Wi-Fi signals, etc.) and motion sensor data. Flight control module 164 can use the wireless signals and/or motion sensor data to determine the location of UAV 160 using well-known dead reckoning and/or trilateration techniques, for example. Flight control module 164 can compare the current location of UAV 160 to the location of the next waypoint in the flight plan received from mission module 166 to determine a heading along which UAV 160 should fly in order to reach the next waypoint. Flight control module 164 can perform this process periodically while in flight to adjust the heading of UAV 160 so that UAV 160 can travel to the next waypoint. For example, if UAV 160 is flying in an environment with a strong wind, flight control module 164 may need to adjust the heading of UAV 160 many times as it is blown around by the wind in order to reach the next waypoint.

In some implementations, mission module 162 can determine the contingency information for the mission based on the contingency conditions and corresponding contingency maneuvers defined in flight package 170. For example, each contingency event can be associated with a respective contingency maneuver that may be different than the contingency maneuvers for other contingency events. Some contingency conditions can be associated with the same contingency maneuver. For example, flight package 170 can describe a default contingency maneuver (e.g., land in designated safe zone) that can be triggered by multiple contingency events. Mission module 162 can send the contingency information to contingency module 166 so that contingency module 166 can monitor for contingency events and cause UAV 160 to execute contingency maneuvers.

In some implementations, UAV 160 can include contingency module 166. For example, contingency module 166 can receive contingency information from mission module 162. The contingency information can, for example, include geofence definitions for approved airspace and restricted airspace and contingency maneuvers to perform when UAV 160 exits approved airspace or enters restricted airspace. For example, contingency module 166 can use the current location of UAV 160 to automatically keep UAV 160 within approved airspace. For example, contingency module 166 can use the current location information to determine when UAV 160 exits a geofence that defines approved airspace. Contingency module 166 can use the current location of UAV 160 to determine when UAV 160 enters a geofence that defines restricted airspace, as described above.

In some implementations, when contingency module 166 detects a contingency event, contingency module 166 can automatically initiate a contingency maneuver. The contingency maneuver can be defined by flight package 170. The contingency maneuver can be a default contingency maneuver configured in contingency module 166. For example, when contingency module 166 detects that UAV 160 exits a geofence defining approved airspace (e.g., a contingency event) for the mission and/or when contingency module 166 detects that UAV 160 enters a geofence defining restricted airspace (e.g., a contingency event), the contingency module 166 can initiate a contingency maneuver. For example, contingency module 166 can send contingency maneuver data to flight control module 162 to cause flight control module 164 to execute a contingency maneuver. For example, the contingency maneuver data can define a flight path for returning UAV 160 to an approved flight path, the contingency maneuver data can define a flight path to safely land UAV 160 at a location where UAV 160 can be safely recovered by the UAV operator, the contingency maneuver data can indicate that flight control module 162 should deploy a parachute, or perform some other contingency maneuver.

In some implementations, flight planning system 102 can include mission telemetry module 112. For example, mission telemetry module 112 can receive mission operational information, including aircraft operational data and/or mission-specific data collected and/or generated by UAVs 160 while performing a UAV mission. In some implementations, aircraft operational data can include the UAV's operational information, such as the UAV's precise three-dimensional location in space, velocity information, UAV status (e.g., health of components included in the UAV), executed contingency plans, and so on. Thus, the mission operational information can include a flight data log that stores changes in the aircraft operational data over time. In some implementations, the mission-specific data can include data generated by special or mission specific payload devices affixed to the UAV. For example, the mission-specific data can include still images, video feeds, sensor data, and/or other mission-specific data generated when inspecting a mission target and/or making a delivery to the mission target, as described above. When mission telemetry module 112 receives mission operational information, mission telemetry module 112 can store the mission operational information in operational database 128. For example, operational database 128 can include a record of each UAV mission managed by flight planning system 102, including the mission operational data received for each respective mission.

In some implementations, the ground control system (GCS) 150 may act as a user device for interacting with the flight planning system 102. For example, GCS 150 can include the functionality and features of user device 140. GCS 150 can be configured to communicate with and control (e.g., using UAV controller application 152) one or more UAVs 160 while the UAVs are in flight. For example, UAV controller application 152 can receive information from flight planning system 102 describing a UAV's flight through reserved airspace. For example, flight planning system 102 can receive (e.g., real-time) UAV location information and transmit the information to UAV controller application 152. UAV controller application 152 can present on a display of GCS 150 a time-based graphical representation of a flight through the reserved airspace based on the information received from flight planning system 102. A UAV operator can provide input to a graphical user interface of UAV controller application 152 to make adjustments to the UAV's flight in real-time. For example, the UAV operator may notice a problem with the aircraft or an obstruction in the airspace where the UAV is flying and command the UAV to initiate a contingency maneuver to safely land and/or avoid the obstruction in the airspace. Thus, UAVs may automatically pilot themselves based on the data in flight package 170 and/or the UAV operator may manually control UAVs 160 using UAV controller application 152 on GCS 150.

Figure 2:
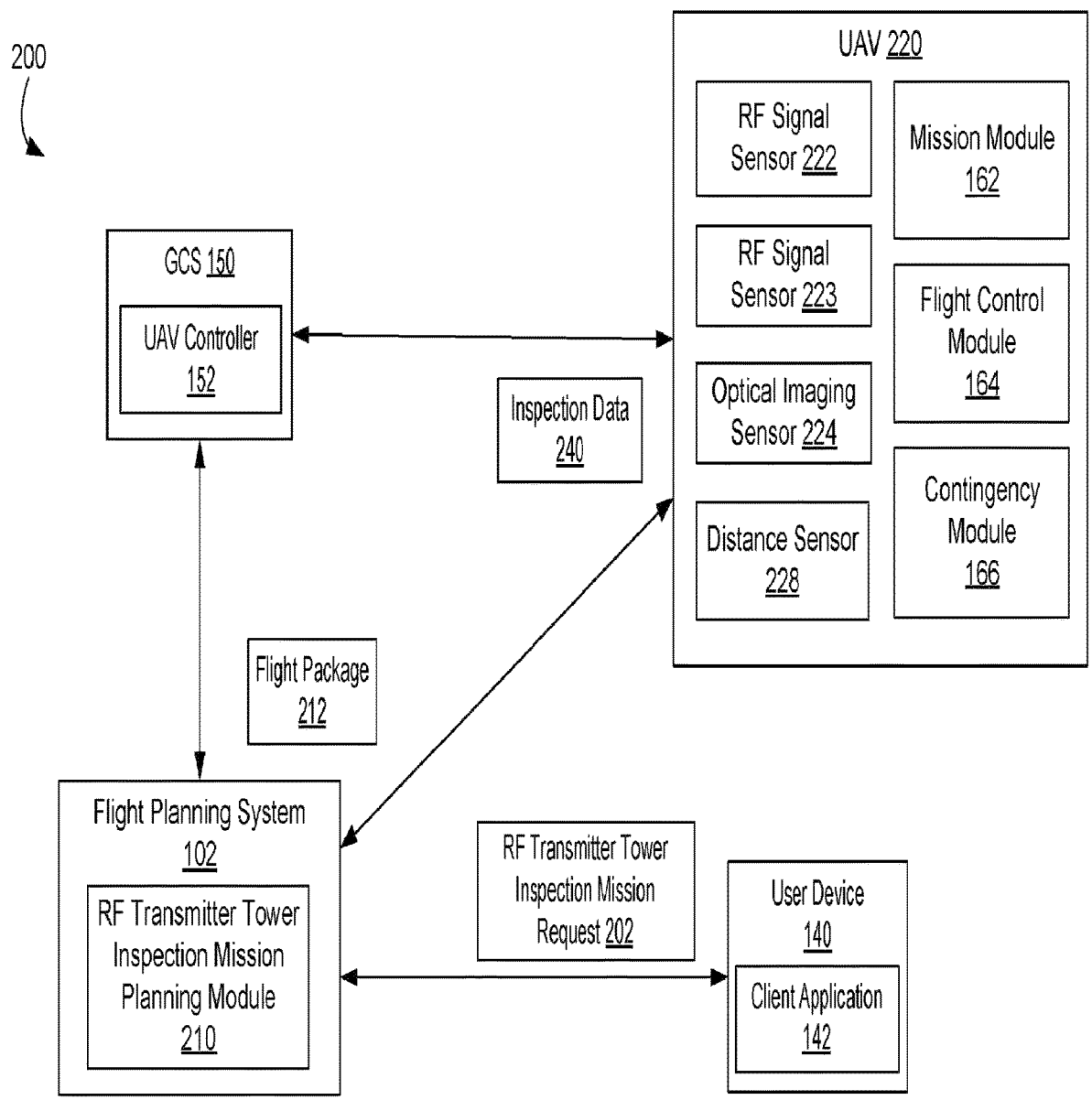
FIG. 2 is a block diagram of an example flight system for dynamically adjusting UAV flight operations based on radio frequency signal data.

FIG. 2 is a block diagram of an example flight system 200 for dynamically adjusting UAV flight operations based on radio frequency signal data. For example, system 200 can correspond to system 100 of FIG. 1. System 200 can be configured, for example, to fly UAV missions to inspect radio transmitters (e.g., or transceivers) mounted on masts, towers, or other tall objects. For example, a radio transmitter may generate and/or transmit radio signals that may cause damage to electronics, biological organisms (e.g., humans, pets, livestock, etc.), and/or other devices, objects, etc. For example, high power radio transmitters (e.g., microwave transmitters) are commonly used in telephonic communication systems, wireless data communication systems, and/or other types of communication systems.

It is essential that the RF transmitters operate properly and are properly aligned so that these high power transmitters can operate efficiently and avoid transmitting signals to locations that might cause damage to life, critical electronics, and/or infrastructure. Routine inspections and maintenance of these RF transmitters allow manufacturers/operators to make repairs or adjustments according to a managed timeline and avoid unscheduled shutdowns that may cost the manufacturer a large sum of money.

Typically, inspections and/or alignment of RF transmitters are performed by humans on the ground or on other RF transmitter towers using signaling devices to inspect the components of the RF transmitters and check the alignment of the transmitters. However, ground inspections are often do not provide a clear picture of the transmitted signal patterns and tower to tower alignment using signaling devices (e.g., beams of light) are inaccurate.

UAVs provide an opportunity for the manufacturer to inspect the tower mounted RF transmitters at relatively close range without incurring the cost of shutting down the RF transmitters. Additionally, UAVs can be configured with sensors that allow the UAV to capture optical images of the RF transmitter in addition to determining the received signal strength at various locations around the RF transmitter. However, UAVs can be susceptible to damage caused by the powerful RF signals generated by these RF transmitters. Thus, UAV flight system 200 can provide features and functionality that allow UAVs to avoid RF signal damage while improving the quality of RF transmitter inspections and alignments.

In some implementations, flight system 200 can include user device 140. As described above, user device 140 can include client application 142. A UAV operator can interact with client application 142 to generate and submit a UAV mission request as described above. For example, the UAV operator can interact with client application 142 to generate RF transmitter inspection mission request 202. The UAV operator can, for example, provide input to client application 142 defining the mission parameters specified in mission request 202, as described further below.

In some implementations, mission request 142 can specify mission parameters for the RF transmitter inspection mission. For example, the mission parameters can include an inspection target definition that defines or describes the object (e.g., RF transmitter tower, target object, etc.) to be inspected. The target definition can, for example, include a geographical location of the target. For example, the geographical location can correspond to the center of the object (e.g., the center of the RF transmitter). The target definition can include the dimensions of the target object. For example, the dimensions can include the height, width, radius, diameter, etc., of the target object. The target definition can, for example, include any other information required to generate a three-dimensional model (e.g., a 3D point cloud, digital surface model, surface mesh, etc.) of the target object. The target definition can include location data for points of interest on the target object. For example, the target definition can include coordinates, relative location data, etc., that identifies points of interest on the surface of the target object. For example, the points of interest can correspond to various RF signal transmitters mounted on a tower (e.g., cellular tower, radio tower, microwave transmitter tower, etc.)

Alternatively, the target definition can identify sections or areas of the target object to inspect. For example, the target definition can indicate that the entire target object is to be inspected or a particular portion (e.g., less than all) of the target object is to be inspected. In the case of RF transmitter tower, the points of interest can include the section of the tower where the RF transmitters are mounted, critical portions of the support structure, the top half of the RF transmitter tower, and the like. The target definition can include a description of obstructions (e.g., guy lines, bracing, etc.). The target definition can include a description of outbuildings, cable installations, and/or other structures in the vicinity of the RF transmitter tower.

In some implementations, the target definition can be generated by the UAV operator, as described above. For example, the target definition can define the physical dimensions of the target object (e.g., the RF transmitter tower, RF transmitter, etc.), as described above. The target definition can define the radio frequencies to be mapped or inspected. Alternatively, the target definition can be obtained by user device 140 or flight planning system 102 from the manufacturer or operator of the RF transmitter tower. For example, a RF transmitter manufacturer and/or tower operator can provide frequency and power output information for each RF transmitter mounted on a tower. The RF transmitter manufacturer and/or tower operator can, for example, provide RSSI maps that indicate the expected RSSI for a transmitted frequency at different locations around the transmitter tower. For example, the UAV operator can provide input to client application 142 identifying the target object and/or the location of the target object (e.g., the RF transmitter tower), and client application 142 or flight planning system 102 can obtain the target definition from a server or other computing device associated with the manufacturer or operator of the RF transmitter tower based on the object identifier and/or location.

In some implementations, the mission parameters specified in mission request 204 can include no-fly zones for the target object. For example, the no-fly zones (e.g., geospatial or volumetric areas) can be specified in the target definition obtained from the RF transmitter tower manufacturer, as described above. The no-fly zones can be automatically generated by client application 142 and/or flight planning system 102 based on the obstructions identified in the target definition described above. The no-fly zones can be specified by the UAV operator by providing input describing the no-fly zones. For example, the UAV operator can provide input to a graphical user interface (e.g., a map display) of client application 142 that defines the no-fly zones in the vicinity of the target object (e.g., the RF transmitter tower).

In some implementations, the mission parameters specified in mission request 204 can include inspection parameters. For example, the inspection parameters can include specifications for the various sensors to be used on the UAV when conducting the aerial inspection of the target object (e.g., the RF transmitter tower). The inspection parameters can include specifications for an optical digital camera (e.g., optical imaging sensor 224), including the camera sensor size (e.g., megapixels), resolution, and/or the focal length of the camera. If the camera has an adjustable focal length (e.g., a zoom lens), then the focal length can include maximum and minimum focal length values for the camera.

In some implementations, the inspection parameters can define the surface sampling distance required for conducting an optical or visual inspection. The surface sampling distance can, for example, be similar to ground sampling distance in that the surface sampling distance defines the amount of surface area that should be covered by a single pixel of the cameras described above (e.g., 1 mm per pixel, 3 mm per pixel, etc.). For example, flight planning system 102, GCS 150, and/or UAV 220 can use the required surface sampling distance, the camera sensor size (or resolution), and the focal length of the camera, to determine appropriate standoff distances for inspecting (e.g., capturing images of) the target object (e.g., the RF transmitter tower). For example, the standoff distance defines how far away from target object the camera can be (or must be) to capture an image (e.g., optical) having the required surface sampling distance. If the camera has an adjustable focal length (e.g., min-max), then the standoff distance can be defined as a range of values between a minimum and maximum distance.

The inspection parameters can include specifications for an RF signal sensor (e.g., RF signal sensor 222, RF signal sensor 223). For example, the sensor specifications can define the type of RF signal sensor and the frequencies that the RF signal sensor is configured to detect. For example, the RF signal sensor can be a radio receiver configured to generate a received signal strength indication (RSSI) for a signal received by the RF signal sensor. The RF signal sensor can be configured to detect (e.g., receive) an RF signal having a particular frequency. For example, the RF signal sensor (e.g., radio frequency receiver) can be configured with a filter that allows the RF signal sensor to receive signals within a particular frequency band. The RF signal sensor can be a wide-band RF signal sensor that can receive signals from various frequencies within the frequency spectrum. For example, the RF signal sensor can be a full frequency RF signal receiver. The RF signal sensor can be a directional or omnidirectional RF signal sensor. For example, the RF signal sensor can be coupled to a directional or omnidirectional antenna for detecting RF signals transmitted from a specific direction or broadcast from any direction.

In some implementations, the inspection parameters can indicate the type of inspection for the UAV to perform. For example, the inspection can be a visual inspection where the UAV captures optical images for a human to inspect. The inspection can be a RSSI survey of specified frequencies or all frequencies in the volumetric area surrounding a RF transmitter tower. The inspection can be an alignment inspection to determine whether two RF transmitters/receivers on different towers are aligned properly.

In some implementations, the mission parameters can include a flight plan. For example, the UAV operator can provide input to client application 142 to specify a take-off location (e.g., starting location), a landing location (e.g., an ending location), and/or one or more waypoints for flying from the starting location to the ending location. For example, the waypoints can be selected to provide the UAV a vantage point from which to perform the inspection (e.g., capture images, sensor data, etc.) of the target object.

In some implementations, after receiving the mission parameters from the UAV operator and/or other resources, client application 142 can send RF transmitter tower inspection mission request 202, including the mission parameters, to flight planning system 102. For example, flight planning system 102 can receive mission request 202 and generate a flight plan for inspecting the target object (e.g., the RF transmitter tower) according to the mission parameters in mission request 202.

In some implementations, flight planning system 102 can include RF transmitter tower inspection mission planning module 210. For example, mission planning module 210 can correspond to mission planning module 108 of FIG. 1. Mission planning module 210 can plan the RF transmitter tower inspection mission based on mission request 202, for example. Mission planning module 210 can generate or obtain map data corresponding to target definition received in mission request 202. For example, mission planning module 210 can generate a three-dimensional model or map of the target object based on the target object location and target object dimensions information included in mission request 202. Mission planning module 210 can obtain a three-dimensional model or map of the target object from network resources (e.g., the RF transmitter tower manufacturer's server, the RF transmitter tower operator's server, etc.). If flight planning system 102 has previously generated a flight plan for the target object, mission planning module 210 can obtain a three-dimensional model or map of the target object from map database 126, as described above.

In some implementations, mission planning module 210 can generate a flight plan for performing a visual or optical inspection of points of interest on the target object specified in mission request 202. For example, if the UAV operator has specified a flight plan in mission request 202, mission planning module 210 can confirm that the operator-specified flight plan is suitable for inspecting the target object. If the UAV operator has not specified a flight plan in mission request 202 or the flight plan specified by the UAV operator is not suitable for the requested mission, mission planning module 210 can automatically generate a flight plan for inspecting the target object. For example, mission planning module 210 can generate a flight plan that includes a take-off location, a landing location, and one or more waypoints that will allow UAV 220 to inspect the points of interest specified in mission request 202 while avoiding the obstructions and no-fly zones specified in the mission request and/or map data corresponding to the target object.

When mission request 202 specifies a portion of the target object to inspect, mission planning module 210 can automatically determine or generate points of interest on the target object based on the portion of the target object to be inspected and the sensor specifications specified in the mission request. For example, when the inspection mission type is a visual inspection mission, mission planning module 210 can determine points of interest on the RF transmitter tower such that after the camera captures an image of each point of interest, the entire portion of the target object has been captured in the images (e.g., optical images, photographic images, thermal images, etc.) generated by the camera. For example, mission planning module 210 can generate a flight plan that includes a take-off location, a landing location, and one or more waypoints that will allow UAV 220 to inspect the points of interest generated or determined by mission planning module 210 while avoiding the obstructions and no-fly zones specified in the mission request and/or map data corresponding to the target object.

In some implementations, mission planning module 210 can generate a flight plan to survey the received signal strength (e.g., of a specific frequency band, of all frequencies, etc.) at various locations around the target object specified in mission request 202. For example, when the inspection mission type is an RSSI mapping mission, mission planning module 210 can generate a flight plan that includes waypoints where the UAV can generate a received signal strength indication (RSSI) indicting the strength of the RF signal at each respective waypoint and/or locations between waypoints. For example, after collecting or generating RSSI values and location information indicating where the RSSI values were generated, UAV 220 and/or flight planning system 102 can generate a three-dimensional RSSI map that represents the RSSI at various locations in the volumetric space surrounding the RF transmitter tower.

In some implementations, mission planning module 210 can generate a flight plan to inspect the alignment of the target object or objects specified in mission request 202. For example, when the inspection mission type is a transmitter alignment mission, mission planning module 210 can generate a flight plan that includes waypoints between target objects (e.g., between two different RF transmitters) where the UAV can receive RF signals from each target object and determine whether the target objects are properly aligned. For example, after collecting RF signal data and location information at each waypoint and/or locations between waypoints, UAV 220 and/or flight planning system 102 can determine whether the RF transmitters (e.g., microwave transmitters) on each RF transmitter tower are properly aligned based on the origination location, orientation and/or overlap of the signal beams received from each RF transmitter.

In some implementations, mission planning module 210 can determine the waypoints based on sensor specifications (e.g., optical camera specifications) and the required surface sampling distance specified in mission request 202. For example, mission planning module 210 can determine the stand-off distance or a range of stand-off distances for capturing images that achieve the required surface sampling distance, as specified in mission request 202. For example the stand-off distance (or range of stand-off distances) can be determined based on the specified surface sampling distance, the size of the camera sensor, and the focal length (or lengths) of the camera using well-known techniques. After the stand-off distance (or range of distances) is determined, mission planning module 210 can select waypoints that provide a view of the points of interest on the target object and that are located at a distance from their respective points of interest determined based on the stand-off distance or range of stand-off distances, as described further below.

In some implementations, mission planning module 210 can determine a flight plan based on RF signal data associated with the target object. For example, when the target object is a RF transmitter tower, mission planning module 210 can obtain an expected RSSI map for the area around the RF transmitter tower that describes the expected RSSI at different distances from and/or locations around the RF transmitter tower under normal, average, or expected operating conditions. For example, the RSSI map can describe the RSSI distribution around the RF transmitter tower when the RF transmitter tower is operating as designed, under normal conditions, and with the proper configuration or orientation of the RF transmitters.

In some implementations, mission planning module 210 can determine the safe RSSI threshold for the UAV (e.g., UAV 220) specified in mission request 202 (e.g., based on UAV specifications stored in UAV database 122). For example, a RF signal with a high RSSI value may interfere with the radio communications of UAV 220 and/or may cause problems with the electrical circuits that control the flight and/or data processing components of UAV 220. Thus, the safe RSSI threshold value can define the maximum RSSI value that UAV 220 can receive and still function properly. Mission planning module 210 can determine a minimum safe operating distance from the RF transmitter tower based on the expected RSSI map for the RF transmitter tower and the safe RSSI threshold for UAV 220. Mission planning module 210 can adjust the determined flight plan to keep UAV 220 at a distance greater than the minimum safe operating distance. For example, mission planning module 210 can determine or specify waypoints that are at a distance away from the RF transmitter tower that is greater than the minimum safe operating distance.

After mission planning module 210 determines or generates the flight plan for the requested inspection mission, mission planning module 210 can generate flight package 212 that includes the flight plan generated by mission planning module 210. For example, flight package 212 can include the flight plan, a geofence that defines airspace reserved for the flight plan, geofences that define no-fly zones (e.g., restricted airspace), map data that includes a 3D model of the target object (e.g., the RF transmitter tower), contingency event definitions and corresponding contingency maneuvers, and any other data required for flying the requested mission, as may be described herein. For example, the contingency events for the RF transmitter tower inspection mission can include (e.g., in addition to geofence events) an RSSI threshold event that causes UAV 220 to move to a safe distance to avoid RF signal interference with the operation of UAV 220 when the RSSI value detected by UAV 220 exceeds the safe RSSI threshold value, as described above. After generating the flight package, flight planning system 102 can send flight package 212 to UAV controller application 152 on ground control system 152 and/or to UAV 220. In some implementations, UAV controller application 152 can send flight package 212 to UAV 220 to configure the UAV for the inspection mission.

In some implementations, flight system 200 can include UAV 220. For example, UAV 220 can correspond to UAV 160 of FIG. 1. UAV 220 can include mission specific hardware and/or software for performing the RF transmitter tower inspection described above. For example, UAV 220 can include RF signal sensor 222 and/or RF signal sensor 223. RF signal sensor 222 and RF signal sensor 223 can be the same type of sensor. For example, RF signal sensor 222 and RF signal sensor 223 can be directional antennas pointed in different directions on UAV 220 to detect RF signals received from different directions. RF signal sensor 222 and RF signal sensor 223 can be different types of RF signal sensors. For example, RF signal sensor 222 can be a RF receiver that filters RF signals in order to detect signals within a first frequency band, while RF signal sensor 223 can be a RF receiver that filters RF signals in order to detect signals within a second frequency band. RF signal sensor 222 can be a RF receiver that filters RF signals in order to detect signals within a first frequency band, while RF signal sensor 223 can be a wide band RF receiver that detects signals of all frequencies.

In some implementations, UAV 220 can include optical sensor 224 (e.g., an optical imaging camera), as described above. UAV 220 can include distance sensor 228 (e.g., LIDAR) for determining the distance between UAV 220 and the inspection target object (e.g., the RF transmitter tower). When UAV 220 receives flight package 212 from flight planning system 102 or GCS 150, mission module 162 can configure UAV 220 to fly the inspection mission defined by flight package 212, as described above. For example, mission module 162 can send flight control 164 the flight plan so that flight control module 162 can navigation and/or control UAV 220 while in flight. Mission module 162 can send contingency module 166 the contingency data (e.g., contingency events, contingency maneuvers) from flight package 212 so that contingency module 166 can monitor for contingency events and trigger contingency maneuvers as described above.

Figure 3:
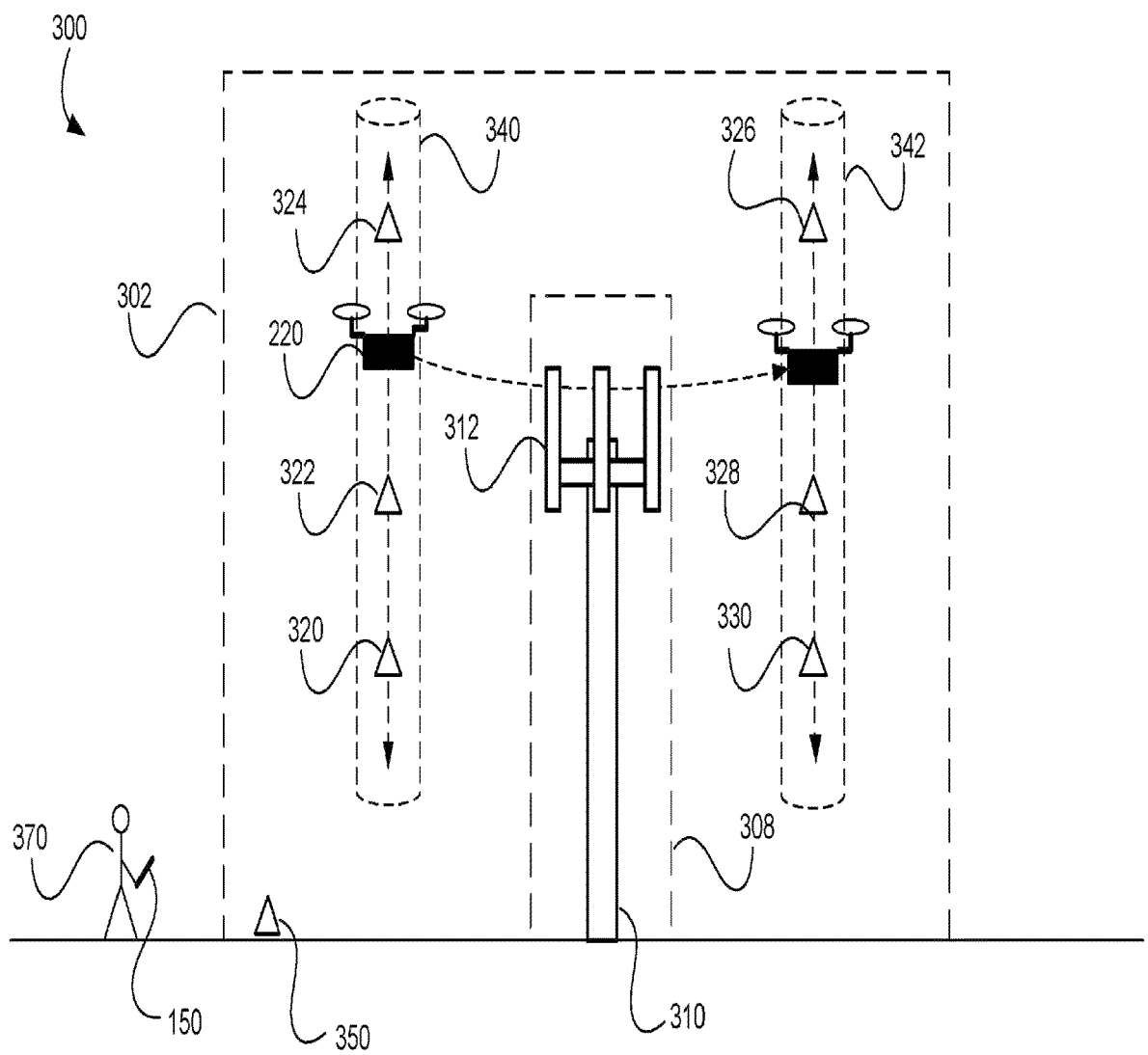
FIG. 3 is an illustration of an example columnar flight plan generated by flight planning system for inspecting a target object.

FIG. 3 is an illustration of an example columnar flight plan 300 generated by flight planning system 102 for inspecting a target object. For example, the flight plan can be an initial flight plan generated by flight planning system 102 for piloting UAV 220 when performing the requested RF transmitter tower inspection mission, as described above. The flight plan can include, for example, reserved airspace geofence 302 defining airspace that UAV 220 must stay within while flying the RF transmitter tower inspection mission. The flight plan can include restricted airspace geofence 308 defining airspace around RF transmitter tower 310 that UAV 220 may stay outside of while flying the RF transmitter tower inspection mission. For example, geofence 308 can be determined based on the minimum safe operating distance determined by flight planning system 102, as described above.

In some implementations, the flight plan can include starting/ending location 350 and waypoints 320-334. For example, waypoints 320-334 can be arranged or ordered such that when UAV 220 moves from waypoint to waypoint, UAV 220 follows a flight path that is mostly columnar. For example, waypoints 320-360 can be arranged in order such than UAV 220 flies vertically upward from waypoint 320 to waypoint 326 in column 340. Stated differently, waypoints 320-326 can be arranged at increasing altitudes over the same ground location (e.g., geographical location, latitude/longitude coordinates, etc.) so that UAV 220 flies upward over the same ground location from waypoint 320 to waypoint 326 while inspecting RF transmitter tower 310 and/or the transmitters affixed thereto.

After UAV 220 reaches waypoint 320, UAV 220 can transition to another column (e.g., column 342) where UAV 220 can navigate downward through waypoints 328-334 while inspecting RF transmitter tower 310. For example, waypoints 320-334 can be arranged so that UAV 220 can collect sensor data for the points of interest on RF transmitter tower 310 specified in mission request 202. For example, while flying from waypoint to waypoint in flight plan 300, UAV 220 can collect images, RF signal information, location information, etc., at various locations along flight path 300. Further, waypoints 320-334 can be arranged such that UAV 220 can avoid obstructions, such as guy lines or supports securing RF transmitter tower 310. While UAV 220 is flying, UAV operator 370 can monitor the progress of UAV 220 using GCS 150. UAV operator 370 can, for example, control UAV 220 while UAV 220 is in flight using GCS 150. For example, if UAV operator 270 notices a malfunction, dangerous environmental conditions, or some other dangerous situation, UAV operator 270 can initiate a contingency maneuver (e.g., return to base, land in safe zone, etc.) using GCS 150.

Figure 4:
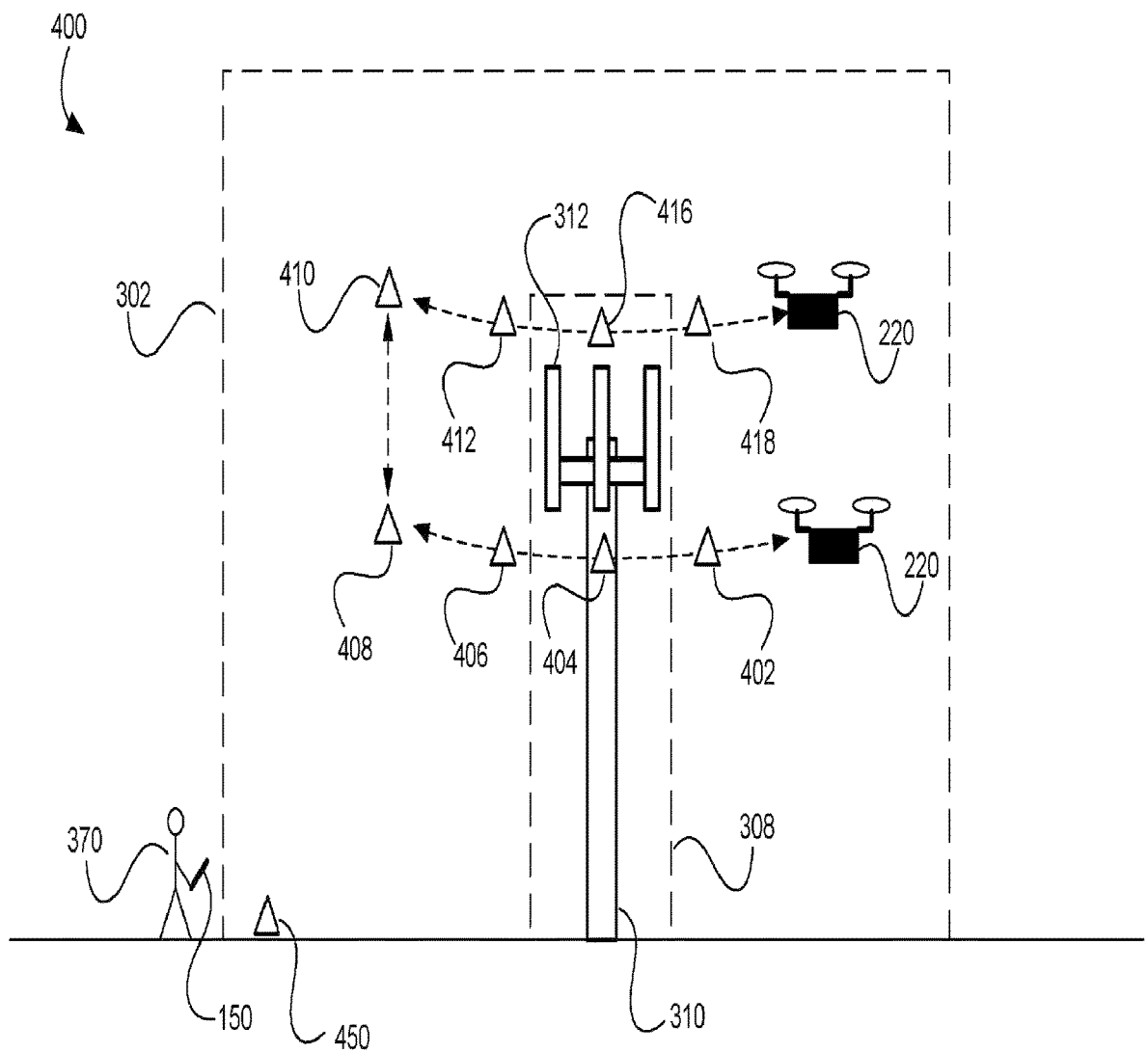
FIG. 4 is an illustration of an example layered flight plan generated by flight planning system for inspecting a target object.

FIG. 4 is an illustration of an example layered flight plan 400 generated by flight planning system 102 for inspecting a target object. For example, the flight plan can have the same geofences as the flight plan of FIG. 3.

In some implementations, flight planning system 102 can generate a flight plan that causes UAV to circle RF transmitter tower 310 in a horizontal layered flight plan. For example, rather than the vertical columnar approach described in FIG. 3, flight planning system 102 can generate a flight plan such that waypoints are ordered to cause UAV 220 to inspect RF transmitter tower 310 at one altitude (e.g., a first layer or level) before increasing or decreasing altitude to inspect RF transmitter tower 310 at a different altitude (e.g., a second layer or level). The altitudes at which UAV 220 circles RF transmitter tower 310 can be determined based on the altitudes at which points of interest have been identified on RF transmitter tower 310, for example.

In some implementations, the flight plan can specify an order for the waypoints that causes UAV 220 to take a bottoms up approach to inspecting RF transmitter tower 310. For example, UAV 220 can take off from starting location 450 and travel at the same (or about the same) altitude from waypoint 402 to waypoint 408 around RF transmitter tower 310 while inspecting (e.g., capturing optical images, capturing RSSI data, capturing RF signal data, capturing UAV location data, etc.) of RF transmitter tower 310. When UAV 220 has circumnavigated RF transmitter tower 310 or when UAV 220 reaches an obstruction or restricted airspace geofence, UAV 220 can transition to a higher altitude (e.g., transition to waypoint 410) and circumnavigate RF transmitter tower 310 at the higher altitude (e.g., by navigating from waypoint 410 to waypoint 418). After transitioning to the higher altitude, UAV 220 can circumnavigate RF transmitter tower 310 in the same direction (e.g., clockwise) as the previous altitude or in a reverse direction (e.g., counter clockwise). For example, UAV 220 may reverse direction when UAV 220 has reached an obstruction or geofence that UAV 220 cannot or should not cross.

In some implementations, the flight plan can specify a top down approach that causes UAV 220 to travel from waypoint 418 to waypoint 402 from a high altitude (waypoint 418) through decreasing altitudes until reaching the low altitude waypoint 402. For example, the flight plan can cause UAV 220 to travel in the reverse of the bottoms up approach described above.

Figure 5:
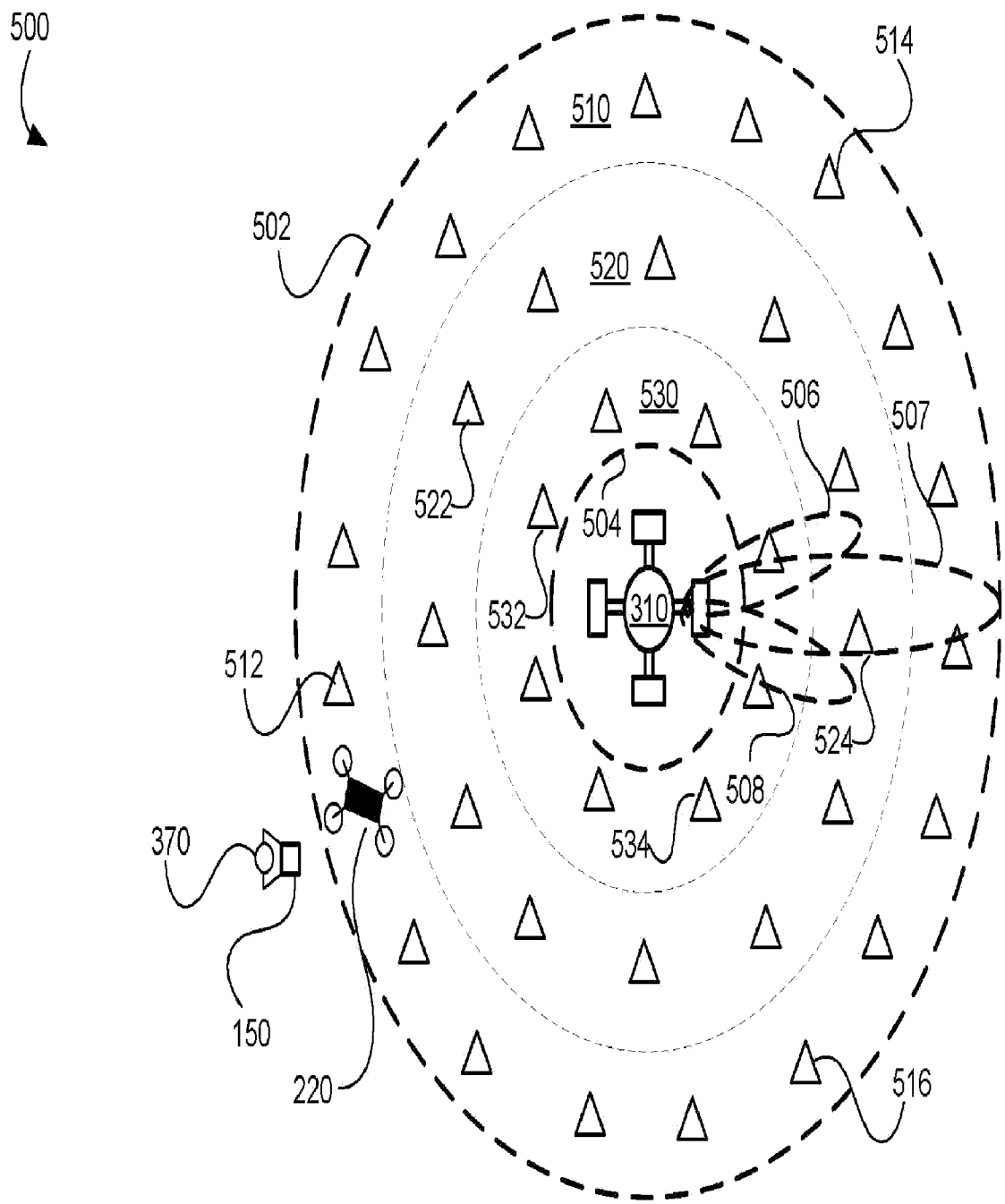
FIG. 5 is an illustration of an initial flight plan generated based on a target definition and/or map data as described above.

FIG. 5 is an illustration of an initial flight plan 500 generated based on a target definition and/or map data as described above. The initial flight plan can be generated by flight planning system 102 based on a static or default target definition and/or map data and, therefore, may not account for environmental conditions, such as wind, weather, current operating conditions of the RF transmitter tower, and/or other variables.

In some implementations, flight plan 500 can include reserved airspace geofence 502. For example, geofence 502 can define an airspace that has been reserved for the aerial inspection of RF transmitter tower 310. UAV 220 can be programmed to stay within geofence 502 while conducting flight operations. UAV 220 can initiate a contingency maneuver if UAV 220 should stray outside of geofence 502 (e.g., UAV 220 may be pushed outside of the geofence by a gust of wind or some other force).

In some implementations, flight plan 500 can include restricted airspace geofence 504. For example, geofence 504 can be generated based on the location and dimensions of RF transmitter tower 310 and any attached RF transmitters. For example, geofence 504 can be generated to keep UAV 220 from flying to close to tower 310 so that UAV 220 does not crash into tower 310. UAV 220 can be programmed to stay outside of restricted airspace geofence 504. For example, should UAV 220 stray into geofence 504, UAV 220 can perform a contingency maneuver to quickly exit the airspace defined by geofence 504.

In some implementations, flight plan 500 can include restricted airspace geofences 506, 507, and/or 508. For example, geofences 506, 507, and/or 508 can be generated based on the maximum safe RSSI threshold for UAV 220. For example, the minimum safe operating distance from tower 310 can be determined by flight planning system 102 based on the default or static RSSI map data for RF transmitter tower 310 and the safe RSSI threshold for UAV 220. For example, the safe RSSI threshold can correspond to the maximum RSSI value that UAV 220 can operate in without causing damage to UAV 220. A single RF transmitter can generate multiple RF signal lobes representing a signal that is broadcast in different directions from the RF transmitter. Geofences 506, 507, and/or 508 can correspond to different signal lobes generated by the same transmitter, for example. Geofences 506 and 508 can correspond to side lobes. Geofence 507 can correspond to the main lobe. UAV 220 can be programmed to stay outside of restricted airspace geofences 506, 507, and/or 508. For example, should UAV 220 stray into one of geofences 506, 507, and/or 508, UAV 220 can perform a contingency maneuver to quickly exit the airspace defined by geofences 506, 507, and/or 508.

In some implementations, flight plan 500 can include a minimum stand-off distance and a maximum stand-off distance. For example, the minimum and maximum stand-off distances can be determined based on the focal lengths (e.g., range of focal lengths) of the cameras configured on UAV 220 and the surface sampling distance defined for the inspection mission. For example, minimum stand-off distance and maximum stand-off distance can define an area in which UAV 220 can move and still capture images that provide the required surface sampling distance. The minimum and maximum stand-off distances allow UAV 220 to adjust its flight path to avoid obstructions and RF signal damage while still accomplishing the RF transmitter tower inspection mission and providing images that meet the required surface sampling distance for the mission. As illustrated by FIG. 5, the minimum standoff distance may be closer to RF transmitter tower than geofences 504-508 may allow. Thus, the effective operating area of UAV 220 for the inspection may be defined by maximum standoff distance and geofences 504-508 rather than by maximum standoff distance and minimum standoff distance.

In some implementations, flight plan 500 can include a flight path defined by a take-off/landing location and waypoints (e.g., waypoints 512-534). For example, since FIG. 5 provides a top-down view of flight plan 500, each waypoint 512-534 can represent multiple waypoints having the same ground location but different elevations, as illustrated in FIGS. 3 and 4. Waypoints (e.g., represented in FIG. 5 and other figures by triangles) can be selected by flight planning system 102 based on points of interest determined for the inspection mission, based on restricted airspace geofences, based on the minimum and maximum stand-off distances, and/or based on locations that provide enough coverage to generate a three-dimensional RSSI map of the area surrounding RF transmitter tower 310, as described above.

When conducting a RSSI mapping inspection mission, UAV 220 can fly to waypoints laid out in concentric circles (or rings) around RF transmitter tower 310. For example, the waypoints within each circle can be laid out at a specified distance from each other (e.g., 3 meters between waypoints, 10 meters between waypoints, etc.). Thus, circles farther away from tower 310 may have a greater number of waypoints than circles closer to tower 310. UAV 220 can, for example, fly from waypoint to waypoint (e.g., waypoints 512, 514, 516, etc.) in ring 510 first, then to the waypoints (e.g., waypoints 522, 524) in ring 520, then to the waypoints (e.g., waypoints 532, 534) in ring 530 while performing the inspection of tower 310. However, since waypoint 524 is within geofence 507, waypoint 524 may be excluded from the flight plan by UAV 220 or flight planning system 102.

By following this flight plan, UAV 220 can take RSSI measurements starting at the waypoints most distant from RF transmitter tower 310 and gradually move to waypoints that are closer to RF transmitter tower 310. Since RSSI values for a signal transmitted from RF transmitter tower 310 will typically become larger as UAV 220 moves closer to tower 310, this approach allows UAV 220 to detect when RSSI values exceed the maximum safe RSSI threshold value for UAV 220 (e.g., a contingency event) and take corrective action to avoid damage to UAV 220 (e.g., a contingency maneuver). For example, when UAV 220 detects an RSSI value equal to or greater than the maximum safe RSSI threshold value for UAV 220, UAV 220 can initiate a contingency maneuver that causes UAV 220 to reverse course and fly in the opposite direction away from the RF transmitter or the high RSSI area.

Moreover, by laying out waypoints at different distances and elevations from RF transmitter tower 310, UAV 220 can generate a more complete RSSI map based on the RSSI readings at each waypoint (e.g., and locations between waypoints). For example, while flying from waypoint to waypoint, UAV 310 can record RSSI mapping data, including current location information and the RSSI information for signals received at the UAV's current location. The current location information can include a location determined based on satellite signals, Wi-Fi signals, cellular signals, and/or other signals, according to well-known trilateration techniques. The current location information can include photogrammetric data (e.g., photographs of ground control points, photographs of tower 310, etc.). The RSSI information can include the frequency, amplitude, and/or RSSI value for the received signal. UAV 220 can store the RSSI mapping data and generate the RSSI map. UAV 220 can send the RSSI mapping data to flight planning system 102 so that flight planning system 102 (or a client device) can generate the RSSI map.

Figure 6:
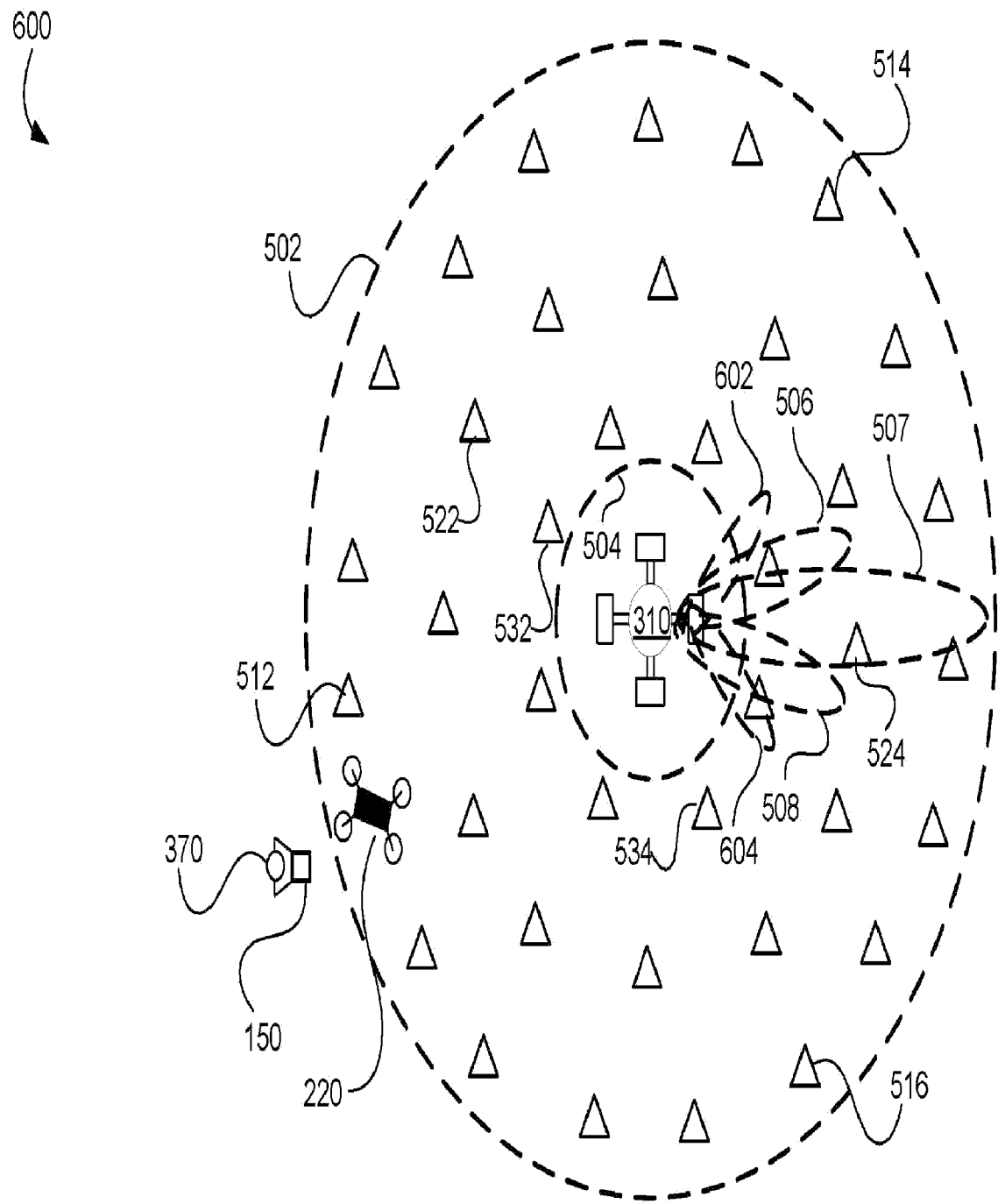
FIG. 6 is an illustration of a modified flight plan generated based on an aerial survey of the area around a target object.

FIG. 6 is an illustration of a modified flight plan 600 generated based on an aerial survey of the area around a target object. For example, while the initial flight plan 500 can be generated by flight planning system 102 based on a static target definition and/or map data, flight plan 600 can be generated by modifying flight plan 500 to account for the actual RF signals generated by RF transmitter tower 310.

In some implementations, UAV 220 can determine the current RF signal conditions around RF transmitter tower 310 by performing a RSSI survey of RF transmitter tower 310 and surrounding areas. For example, UAV 220 can be configured to fly to a safe distance (e.g., ring 510) away from RF transmitter tower 310. When UAV 220 reaches the safe distance, UAV 220 can initiate an RSSI survey of RF transmitter tower 310 using a RSSI sensor (e.g., RF signal sensor 222, RF signal sensor 223) to generate a RSSI map of the area surrounding RF transmitter tower 310. For example, UAV 220 can gradually fly closer to RF transmitter tower 310 and collect RF mapping data (e.g., location information, RF signal information, photogrammetry data, etc.), as described above. UAV 220 can take an optical survey of RF transmitter tower 310 using an optical sensor (e.g., optical imaging sensor 224, a camera, etc.) to generate images that can be analyzed (e.g., by a computer, by a human) to inspect tower 310 and RF transmitters attached to tower 310.

While conducting the RSSI survey, UAV 220 can dynamically adjust the UAV's flight plan and/or flight path to account for detected RF signal strength detected around tower 310. For example, UAV 220 may detect RSSI values that indicate a signal distribution around tower 310 that differs from the expected signal distribution indicated in the default RSSI map, as indicated by the operator or manufacturer of RF transmitter tower 310 and/or the operator or manufacturer of the transmitters attached to RF transmitter 310. For example, UAV 220 can detect RSSI values that indicate a signal strength at various locations that is stronger or weaker than the expected values. UAV 220 can detect RSSI values that indicate the transmitter is broadcasting in a different direction or orientation than expected. UAV 220 can detect RSSI values that indicate the RF transmitter is generating a different number of lobes than expected. For example, UAV 220 can detect that an RF transmitter on tower 310 is generating more lobes than the three (e.g., main lobe and two side lobes) originally expected.

In response to detecting these variations from the expected RSSI distributions (e.g., as indicated by manufacturer or operator data), UAV 220 can adjust the flight plan and/or flight path of UAV 220. For example, UAV 220 can dynamically adjust its flight plan to add geofences 602 and/or 604 to account for the additional two lobes detected during the RSSI survey. UAV 220 can dynamically adjust (e.g., expand or shrink) geofences 506, 507, and 508 according to the differences between the expected RSSI values and the actual RSSI measurements. UAV 220 can dynamically adjust (e.g., change orientation) geofences 506, 507, 508 to account for the actual orientation of the corresponding lobes, as determined by the actual RSSI measurements. As described above, the boundaries of the geofences can be generated or modified based on the RF signal strength limits (e.g., safe operating threshold) of UAV 220. UAV 220 can use the actual RSSI measurements and/or geofences to avoid areas around tower 310 where the signal strength of transmitted signals might interfere with the operation of UAV 220. For example, UAV 220 can remove or exclude from its flight path waypoints (e.g., waypoint 534) in the initial flight plan that coincide with geofences 506, 507, 508, 602 and/or 604.

In some implementations, UAV 220 can dynamically adjust its flight based on real-time RSSI measurements. For example, UAV 220 can monitor RSSI measurements as UAV 220 flies along a flight path from waypoint to waypoint. UAV 220 can detect increasing RSSI values and automatically adjust its flight path when UAV 220 reaches a location where the RSSI measurements exceed a safe operating threshold value, as described above. For example, UAV 220 can change directions (e.g., up, down, left, right, forward, backward, etc.) to move away from or skirt an area having high RSSI values that are greater than the safe RSSI threshold value specified for UAV 220.

In some implementations, UAV 220 can use the actual RSSI measurements to generate an RSSI map (e.g., volumetric, three dimensional map) of the area surrounding tower 310 that describes the frequencies, amplitudes, and/or signal strengths of signals received at various locations around tower 310. UAV 220 can send the RSSI measurements and/or RSSI map to GCS 150 and/or flight planning system 102 for additional processing. For example, UAV 220, GCS 150, and/or flight planning system 102 can analyze the RSSI measurements and/or RSSI map to determine the shape of RF signal lobes generated by RF transmitters.

UAV 220, GCS 150, and/or flight planning system 102 can analyze the RSSI measurements and/or RSSI map to determine whether the RF transmitters are aimed in the appropriate direction or azimuth (e.g., as specified by the RF transmitter operator). For example, UAV 220, GCS 150, and/or flight planning system 102 can analyze the RSSI measurements and/or RSSI map to determine the orientation, shape, and/or direction of RF signal beams originating from an RF transmitter on tower 310. UAV 220, GCS 150, and/or flight planning system 102 can analyze the RSSI measurements and/or RSSI map to use the RF signal beam information to determine the location and/or orientation of the RF transmitter on tower 310. UAV 220, GCS 150, and/or flight planning system 102 can analyze the RSSI measurements and/or RSSI map to determine whether the RF transmitters on tower 310 are operating properly (e.g., broadcasting at the desired frequency and/or power). If UAV 220, GCS 150, and/or flight planning system 102 determines that the RF transmitters are not configured correctly, GCS 150 and/or flight planning system 102 can notify the UAV operator, and/or RF transmitter operator that the RF transmitter is not operating as desired or specified.

Figure 7:
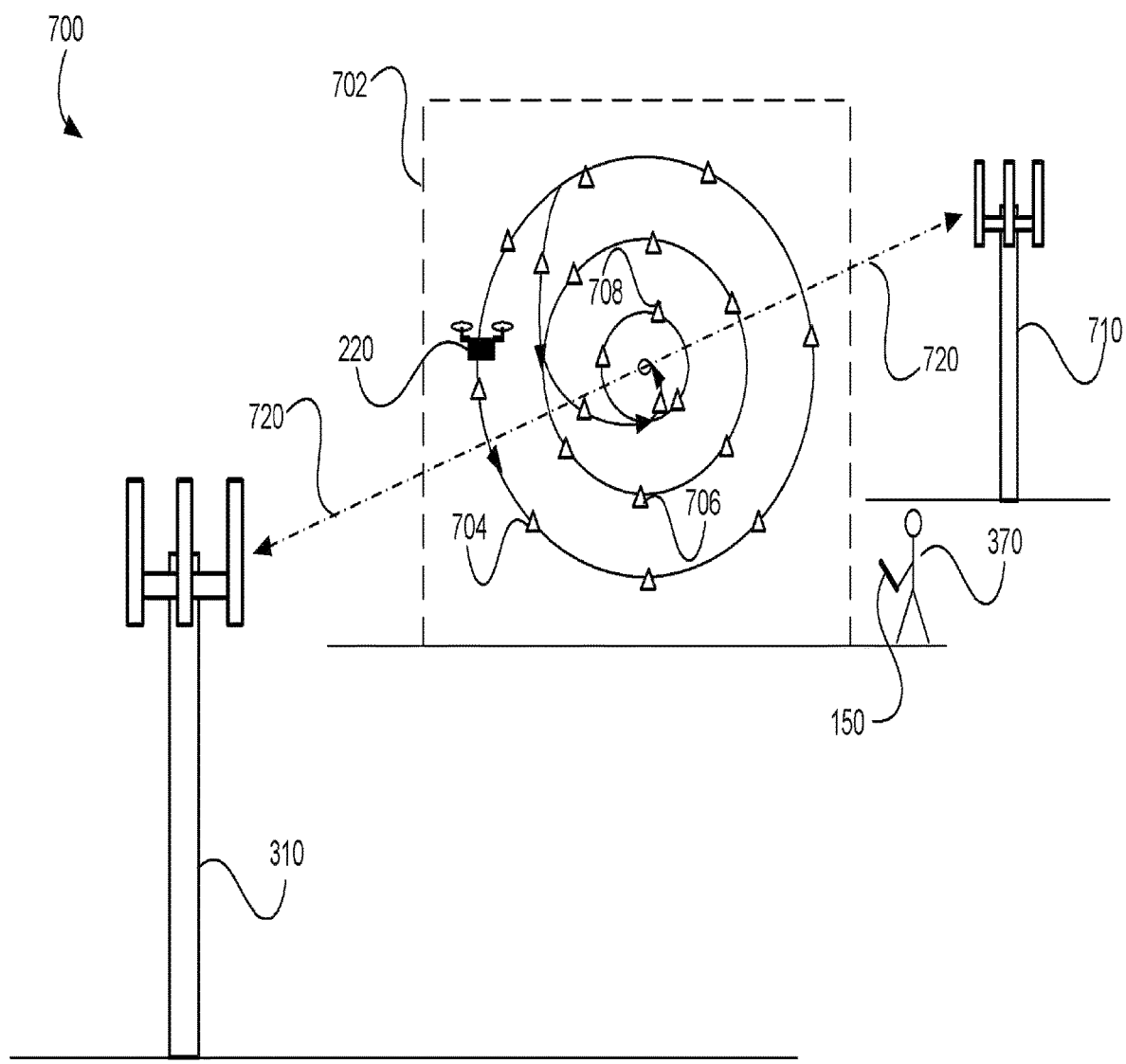
FIG. 7 illustrates an example flight path for inspecting the alignment of RF transmitters.

FIG. 7 illustrates an example flight path 700 for inspecting the alignment of RF transmitters. For example, some RF transmitter towers are configured with RF transmitters that communicate directly with end user devices. For example, cellular data RF transmitters use radio access technology to allow smartphone users access to a cellular data network. However, some tower mounted RF transmitters (e.g., transceivers) communicate with RF receivers (e.g., transceivers) mounted on other towers to enable an RF data network. For example, communications towers can be configured with microwave transceivers that transmit high power RF signals to other communications towers to establish a RF data network between towers. This tower to tower communication mechanism works best (e.g., most efficiently) when the RF signal beams are properly aligned between RF transmitter and RF receiver. Thus, in some implementations, UAV 220 can fly an aerial inspection mission to inspect the alignment of the RF transmitter and RF receiver.

In some implementations, mission planning module 210 can generate flight plan for performing an RF transmitter alignment inspection mission. For example, flight planning system 102 can receive mission request 202 indicating that the UAV operator would like to fly an RF transmitter alignment inspection mission. Mission request 202 can, for example, identify both RF transmitter tower 310 and RF transmitter tower 710 as targets of the alignment inspection mission. When mission planning module 210 receives the alignment inspection mission request, mission planning module 210 can use the location and height information for each tower 310 and 710 to determine a likely signal path 720 between towers 310 and 710. Mission planning module 210 can then generate a flight path for intercepting an RF signal beam sent from RF transmitter tower 310 to RF receiver tower 710. In some implementations, the same flight path can be used to intercept an RF signal beam send from RF transmitter tower 710 to RF receiver tower 310.

In some implementations, mission planning module 210 can generate a flight plan that includes reserved airspace geofence 702. For example, mission planning module 210 can reserve the airspace needed for the alignment inspection mission at a location between tower 310 and tower 710. Mission planning module 210 can select the airspace to reserve based on signal path 720, obstructions near signal path 720, and/or no-fly zones along signal path 720. For example, mission planning module 210 can select airspace such that signal path 720 is centered (or nearly centered) in the reserved airspace and is not over a populated area (e.g., no-fly zone). After selecting the airspace, mission planning module 210 can generate geofence 702 to define the boundaries of the three-dimensional reserved airspace.

In some implementations, mission planning module 210 can generate a flight path for intercepting a signal beam travelling between towers 310 and 710. For example, mission planning module 210 can generate a flight path resembling concentric circles centered on and/or oriented perpendicularly (or nearly perpendicularly) to the expected signal path 720 between towers 310 and 710, as illustrated by FIG. 7. The waypoints (e.g., represented by triangles) along the flight path can be ordered such that UAV 220 flies from the largest, outermost circle inwards toward the smallest circle at the center of the concentric circles. For example, UAV 220 can fly to each waypoint (e.g., waypoint 704) in the outermost circle before transitioning inward to the next circle. UAV 220 can fly to each waypoint (e.g., waypoint 706) in the current circle before transitioning inward to fly to the waypoints (e.g., waypoint 708) the next circle until UAV 220 reaches the center of the circles. The circular flight path described above is one example of a flight path that may be generated by mission planning module 210. Other flight paths that may be generated by mission planning module 210 may resemble a rectangular grid or three dimensional shapes like a sphere or cube.

While flying along the flight path, UAV 220 can collect RF signal information (e.g., RSSI, frequency, amplitude, etc.) for the signals received from tower and location information (e.g., photogrammetry data, satellite signal data, latitude, longitude, altitude, etc.) describing the position of UAV 220 when the signals were received. For example, UAV 220 can include a single RF signal sensor 222 (e.g., a directional antenna and RF receiver) for receiving signals coming from the direction of tower 310. For example, UAV 220 can fly with signal sensor 222 directed at tower 310 to receive RF signals generated by tower 310. When signals are received from tower 310, UAV 220 can record the RSSI, frequency and/or amplitude for the received signal along with the location information describing the current location of UAV 220 when the signals were received.

Based on the RF signal information and location information, UAV 220 can determine an RSSI map for the received signal from which UAV 220 can determine the origination (e.g., transmitter location) and orientation of the received signal. Based on the signal origination and orientation, UAV 220 can determine whether the transmitter sending the RF signal is configured correctly to transmit a signal to tower 710. UAV 220 can fly a similar mission to determine whether signals transmitted from transmitters on tower 710 are configured correctly (e.g., aimed correctly) for transmitting signals from tower 710 to tower 310.

In some implementations, UAV 220 can be configured to collect RF signal information from tower 310 and tower 710 simultaneously. For example, UAV 220 can be configured with two RF signal sensors for collecting RF signal information from transmitters on tower 310 and tower 710 at about the same time. UAV 220 can include directional RF sensor 222 and directional RF sensor 223, for example. RF sensor 222 and RF sensor 223 can be oriented 180 degrees apart (e.g., in opposite directions) so that UAV 220 can receive or detect signals from transmitters on both tower 310 and tower 710 at the same time.

As described above, when UAV 220 receives the signals from tower 310 and/or tower 710, UAV 220 can determine the RSSI, frequency, and/or wavelength of the signal and store the signal information along with location information describing the location of UAV 220 when the signal was received. Based on the RF signal information and location information, UAV 220 can determine an RSSI map (or multiple RSSI maps) for the signals received from both tower 310 and tower 710. UAV 220 can use the RSSI maps to determine the origination (e.g., transmitter location) and orientation of the signals received from towers 310 and 710. Based on the signal origination and orientation, UAV 220 can determine whether the transmitters sending the RF signals from towers 310 and 710 are configured (e.g., oriented) correctly to transmit a signal to tower 710 and 310, respectively. Thus, UAV 220 can collect the signal information necessary to inspect the alignment of transmitters/receivers on both tower 310 and tower 710 simultaneously.

Example Process

Figure 8:
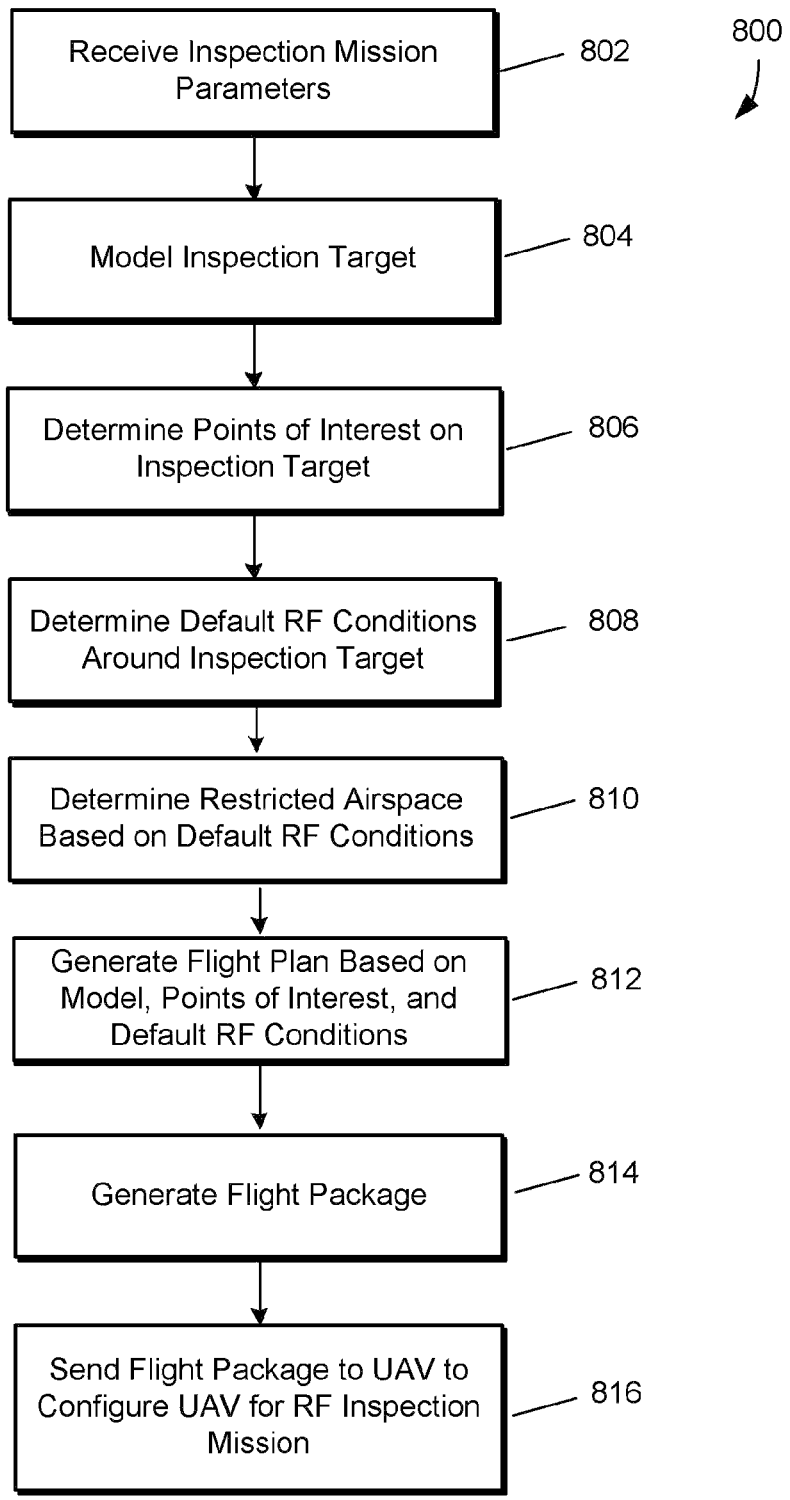
FIG. 8 is a flow diagram of an example process for generating a flight plan for inspecting an RF transmitter tower.

FIG. 8 is a flow diagram of an example process 800 for generating a flight plan for inspecting an RF transmitter tower. For example, process 800 can be performed by flight planning system 102 to prepare or configure UAV 220 to perform a RF transmitter tower inspection mission while avoiding areas where RF signal strength may cause damage to UAV 220, as described above. Process 800 can be performed by flight planning system 102 of FIG. 1 in response to receiving a RF transmitter tower inspection mission request from a UAV operator.

At step 802, flight planning system 102 can receive RF transmitter tower inspection mission parameters. For example, flight planning system 102 can receive the mission parameters in mission request 202 of FIG. 2.

At step 804, flight planning system 102 can model the inspection target object. For example, flight planning system 102 can model the RF transmitter tower based on a target definition received in mission request 202. For example, flight planning system 102 can generate a digital three-dimensional model of the RF transmitter tower and the surrounding airspace.

At step 806, flight planning system 102 can determine points of interest on the inspection target. For example, flight planning system 102 can determine points of interest for inspecting on the RF transmitter tower based on inspection points or inspection areas defined in mission request 202, as described above.

At step 808, flight planning system 102 can determine default RF conditions around the inspection target object. For example, flight planning system 102 can obtain information describing the default or expected transmission frequencies and transmission power of RF transmitters on of the RF transmitter tower to be inspected. For example, flight planning system 102 can obtain RSSI maps for the various frequencies transmitted by RF transmitters mounted on the RF transmitter tower that shows the expected RSSI values for the various frequencies at different locations within the volumetric areas or airspace around the RF transmitter tower.

At step 810, flight planning system 102 can determine restricted airspace based on the default RF conditions around the RF transmitter tower. For example, flight planning system 102 can determine locations and/or areas around the RF transmitter tower where the RSSI values are greater than a maximum safe RSSI threshold value specified for UAV 220. Flight planning system 102 can identify airspace where the expected RSSI values exceed the minimum safe RSSI threshold value for UAV 220 as restricted airspace.

At step 812, flight planning system 102 can generate a flight plan based on the target object model, the points of interest, and the default RF conditions. For example, flight planning system 102 can determine no-fly zones (e.g., geofences) based on the restricted airspaces determined at step 810. Flight planning system 102 can select way points for the flight plan based on the object model and points of interest that allows the UAV to inspect the points of interest without flying into the no-fly zones around the target object. Flight planning system 102 can define contingency events and corresponding contingency maneuvers for the flight plan based on the no-fly zones, UAV operating thresholds (e.g., RSSI thresholds), and/or other conditions, as described above.

At step 814, flight planning system 102 can generate a flight package that includes the flight plan. For example, flight planning system 102 can generate a flight package that provides configuration data and/or programming for the UAV to fly (e.g., autopilot) the RF transmitter tower inspection mission.

At step 816, flight planning system 102 can send the flight package to the UAV. For example, flight planning system 102 can send the flight package to UAV 220 to configure UAV 220 to fly the RF transmitter tower inspection mission defined in the flight package.

Figure 9:
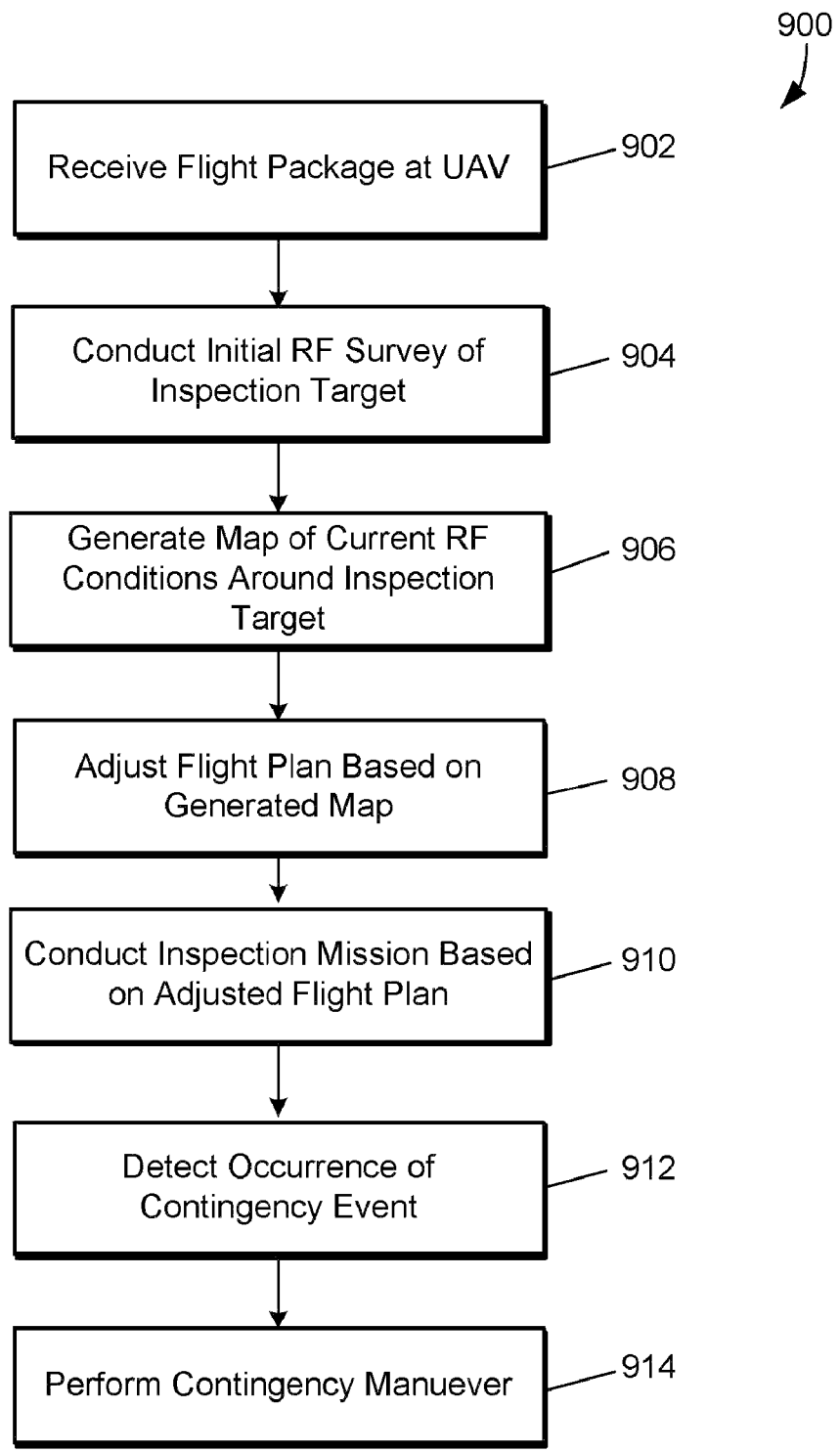
FIG. 9 is a flow diagram of an example process for executing a flight plan for inspecting an RF transmitter tower.

FIG. 9 is a flow diagram of an example process 900 for executing a flight plan for inspecting an RF transmitter tower. For example, process 900 can be performed by UAV 220 based on a flight package generated by flight planning system 102, as described above.

At step 902, UAV 220 can receive a flight package. For example, UAV 220 can receive the flight package generated by flight planning system 102 for inspecting a RF transmitter tower, as described above. The flight package can include a model of the RF transmitter tower to be inspected, locations of inspection points on the RF transmitter tower, a flight plan including way points for inspecting the RF transmitter tower, standoff distances calculated for capturing images having a specified surface sampling distance, geofences defining reserved airspace and/or no-fly zones, contingency events and corresponding contingency maneuvers, and/or other information necessary for performing an aerial inspection of the targeted RF transmitter tower or towers.

At step 904, UAV 220 can conduct an initial survey of the inspection target object. For example, before executing the flight plan or at the beginning of the flight plan, UAV 220 can fly to a safe distance away from the RF transmitter tower and perform a RSSI survey of the area around the RF transmitter tower using RF signal sensors configured on UAV 220. For example, UAV 220 can perform an initial survey focused on specific frequencies specified in the flight package. UAV 220 can perform an initial survey of all frequencies when no specific frequencies are specified in the flight package.

At step 906, UAV 220 can generate a map of the current RF conditions around the inspection target. For example, based on the initial survey, UAV 220 can generate one or more RSSI maps that describe the RSSI values detected for various RF frequencies at various locations around the RF transmitter tower.

At step 908, UAV 220 can adjust the flight plan based on the generated RSSI map. For example, UAV 220 can adjust the flight plan based on the current RF conditions around the RF transmitter tower. UAV 220 can adjust the flight plan by generating no-fly zones/geofences around volumetric areas (e.g., airspaces) having high RSSI values that may damage UAV 220 and/or interfere with the operation of UAV 220. UAV 220 can remove way points that correspond to locations within the no fly zones from the flight plan. UAV 220 may change the order or sequence of the way points in the flight plan and/or make other modifications to the flight plan, as described herein above.

At step 910, UAV 220 can conduct the inspection mission based on the adjusted flight plan. For example, UAV 220 can fly to the way points specified in the adjusted flight plan and capture optical images of points of interest on the RF transmitter tower. UAV 220 can fly to the way points specified in the adjusted flight plan and capture RF signal mapping data at various locations around the RF transmitter tower. For example, the RF signal mapping data can include RF signal information describing the frequency, wavelength, and/or RSSI value of a detected RF signal. The RF signal mapping data can include location information that includes photogrammetric images and/or location data (e.g., geographic coordinates and altitude) derived from satellite, cellular, and/or Wi-Fi signals. The RF signal mapping data can associate the RF signal information with the corresponding location information describing where the RF signal information was detected so that a RF signal map can be generated that represents the detected signals at corresponding locations around the RF transmitter tower.

At step 912, UAV 220 can detect the occurrence of a contingency event. For example, UAV 220 can detect a contingency event when UAV 220 receives a signal having an RSSI value that exceeds the maximum safe RSSI threshold value for UAV 220. UAV can detect a contingency event when UAV 220 enters a restricted airspace (e.g., no-fly zone) geofence. UAV 220 can detect a contingency event when UAV 220 moves closer than a threshold distance from the RF transmitter tower. UAV 220 can detect other contingency events, as may described herein.

At step 914, UAV 220 can perform a contingency maneuver. For example, UAV 220 can perform a contingency maneuver in response to detecting a contingency event. For example, UAV 220 can perform a contingency maneuver that causes UAV 220 to fly to the previous way point in the flight plan. UAV 220 can perform a contingency maneuver that causes UAV 220 to fly to an emergency landing location and land. UAV 220 can perform a contingency maneuver that causes UAV 220 to reverse course and/or fly a distance away from the RF transmitter tower avoid airspace where UAV 220 has detected RSSI values that exceed the safe RSSI threshold value for UAV 220. UAV 220 can perform a contingency maneuver that causes UAV 220 to exit a restricted airspace geofence. UAV 220 can perform a contingency maneuver that causes UAV 220 to skip the RF transmitter tower inspection at the current way point that has an RSSI value that exceeds a maximum safe RSSI threshold value, fly to the next way point in the flight plan that has an RSSI value that is less than the maximum safe RSSI threshold value for UAV 220, and continue the flight plan.

Many of the implementations described include UAV 220 performing data collection using various sensors and data analysis to determine safe or unsafe airspace, generate geofences, generate RF signal maps, etc. However, according to some implementations, UAV 220 can send sensor data (e.g., imaging sensor data, RF signal sensor data, etc.) to flight planning system 102 and/or GCS 150 for analysis. Thus, in some implementations, flight planning system 102 and/or GCS 150 may perform the sensor data analysis to determine safe or unsafe airspace, generate geofences, and/or generate RF signal maps. After performing the analysis of the sensor data and determining safe or unsafe airspace, generating geofences, and/or generating RF signal maps, flight planning system 102 and/or GCS 150 can send an updated or modified flight plan to UAV 220 that includes the updated flight plan, geofences, RF signal maps, etc., so that UAV 220 can continue flying the RF transmitter tower inspection mission in a safe manner.

In some implementations, when UAV 220, flight planning system 102, and/or GCS 150 generates an RF signal map (e.g., RSSI map, signal distribution map, etc.), flight planning system 102, and/or GCS 150 can send the RF signal map to the UAV operator that requested the RF transmitter tower mission sot that the UAV operator and/or RF transmitter tower operator can determine whether the RF transmitter tower is operating as desired.

Example System Architecture

Figure 10:
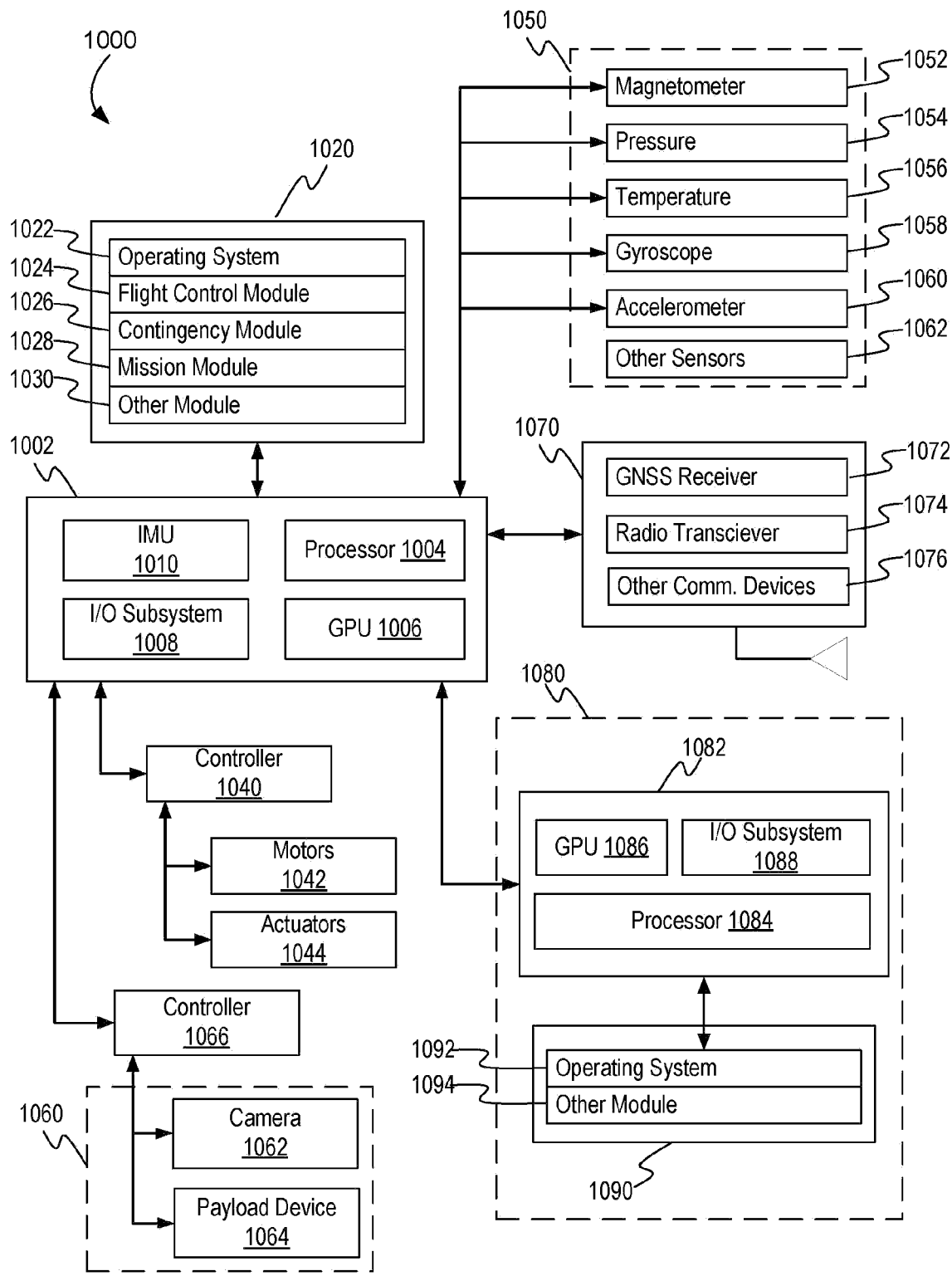
FIG. 10 illustrates a block diagram of an example unmanned aerial vehicle (UAV) architecture for implementing the features and processes described herein.
Figure 11A:
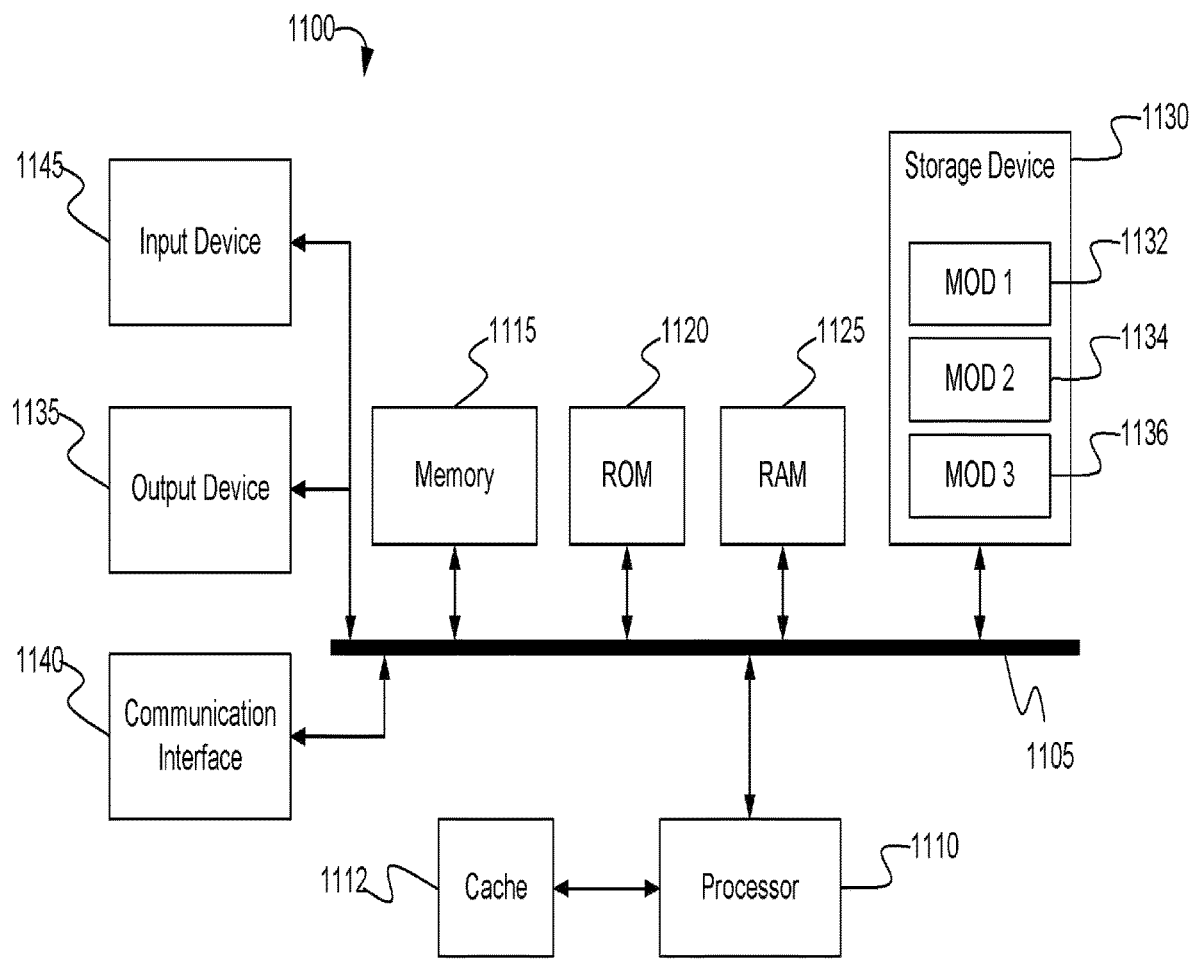
FIG. 11A and FIG. 11B show example system architectures for the computing devices performing the various operations, processes, and functions described herein.
Figure 11B:
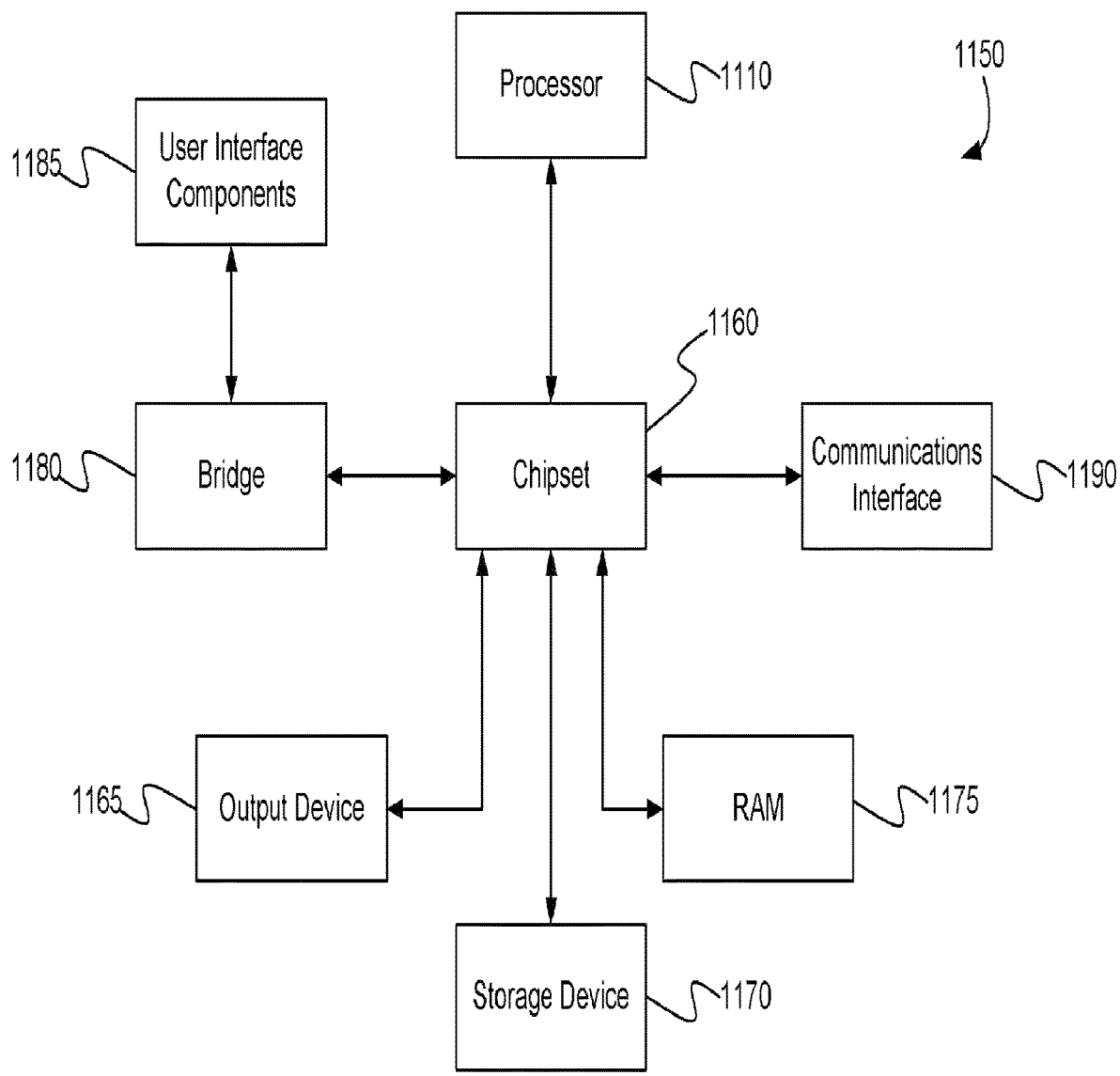

FIG. 10 illustrates a block diagram of an example system architecture 1000 for an unmanned aerial vehicle (UAV). For example, system architecture 1000 can be configured with the hardware and/or software for implementing the UAV features and processes described herein. System architecture 1000 can correspond to UAV 160, as described above with reference to FIG.

In some implementations, system architecture 1000 can include primary processing system 1002. For example, primary processing system 1002 can be a system of one or more computers, including hardware and/or software, that is in communication with, or maintains, one or more databases. In some implementations, primary processing system 1002 can include one or more processors 1004 (e.g., CPU, application processor, etc.), graphics processors 1006 (e.g., GPU), and/or I/O subsystem 1008. In some implementations, primary processing system 1002 can include additional or different logic circuits, analog circuits, associated volatile and/or non-volatile memory, associated input/output data ports, power ports, etc., not shown. Similarly, primary processing system can include various software processes executing on processors 1004 or other computers included in primary processing system 1002.

In some implementations, memory 1020 may include non-volatile memory, such as one or more magnetic disk storage devices, solid state hard drives, or flash memory. Other volatile memory such a RAM, DRAM, SRAM may be used for temporary storage of data while the UAV is operational. Memory 1020 may include databases for storing information describing UAV flight operations, flight plans, contingency events, geofence information, component information, and other information. Memory 1020 may include various modules, programs, applications, and/or instructions that cause the UAV to perform flight operations, contingency maneuvers, missions, and other functions.

In some implementations, memory 1020 can include operating system 1022. For example, operating system 1022 can be a real time operating system (RTOS), UNIX, LINUX, OS X, WINDOWS, ANDROID or other operating system. Operating system 1022 may include instructions for handling basic system services and for performing hardware dependent tasks. However, other software modules and/or applications may be executed as operating system processes. For example, flight control module 1024, contingency module 1026, and/or mission module 1028, may be part of operating system 1020 and may be executed as operating system processes.

In some implementations, memory 1020 can include flight control module 1024. For example, flight control module 1024 (e.g., flight control module 164) can be configured to handle flight control operations for the UAV. Flight control module 1024 can interact with one or more controllers 1040 that control operation of motors 1042 and/or actuators 1044. For example, motors 1042 may be used for rotation of UAV propellers. Actuators 1044 may be used for UAV flight surface control such as ailerons, rudders, flaps, landing gear, and parachute deployment.

In some implementations, memory 1020 can include contingency module 1026. For example, contingency module 1026 (e.g., contingency module 166) can monitor and handle UAV contingency events. For example, contingency module 1026 may detect that the UAV has crossed a border of a geofence, and then instruct flight control module 1024 to return to a predetermined landing location. Contingency module 1026 can detect other contingency events, including a low battery or fuel state, a malfunction of an onboard sensor, motor, or other component, and/or a deviation from the flight plan. When contingency module 1026 detects a contingency event, contingency module 1026 can instruct flight control module 1024 to return to a predetermined landing location or perform some other contingency operation. For example, if the UAV is equipped with a parachute, contingency module 1026 may cause the deployment of the parachute when a motors and/or actuator fails. The foregoing is not meant to be limiting, as contingency module 1026 may detect other contingency events and/or perform other contingency operations.

In some implementations, memory 1020 can include mission module 1028. For example, mission module 1028 (e.g., mission module 162) can process flight plans, waypoints, and other associated information with a flight plan as provided to the UAV in a flight package. For example, a flight package can include one or more flight plans. Each flight plan can including a flight schedule (e.g., start time, end time), start location, destination location, waypoints for navigating from the start location to the destination location, contingency event definitions, contingency operations for each contingency event. The flight package can include operator (e.g., pilot) information, such as the name of the operator, the operator's employer, the operator's license information (e.g., including UAV ratings), etc. The flight package can include UAV information, such as the UAV type, payload, model, size, operating range, an/or other UAV specifications describing the UAV that will perform the mission described by the flight package. In some implementations, mission module 1028 can work in conjunction with flight control module 1024. For example, mission module 1028 can send information concerning the flight plan to flight control module 1024. For example, mission module 1028 can send flight control module 1024 the flight start location, end location, waypoint coordinates (e.g., latitude, longitude), flight altitude, flight velocity, etc., so that the flight control module 1024 can automatically pilot the UAV along the flight path.

Various sensors, devices, firmware and other systems may be interconnected to support multiple functions and operations of the UAV. For example, the UAV primary processing system 1002 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

In some implementations, primary processing system 1002 may be coupled to one or more sensors 1050, such as magnetometer 1052, pressure sensors (static or differential) 1054, temperature sensors 1056, gyroscopes 1058, accelerometers 1060, and/or other sensors 1062, such as current sensors, voltage sensors, hydrometer, motor sensors and/or any other sensors, as may be described herein.

In some implementations, primary processing system 1002 may use an inertial measurement unit (IMU) 1010 for use in navigating the UAV. For example, IMU 1010 can use measurements from magnetometer 1052, gyroscope 1058, accelerometer 1060 and/or other sensors to determine the specific force of the UAV, the angular rate of the UAV, and/or magnetic field surrounding the UAV. Sensors 1050 and/or other components of architecture 1000 can be coupled to primary processing system 1002, or to controller boards coupled to primary processing system 1002, using one or more communication buses, such as a controller area network (e.g., CAN) bus, or other signal lines.

In some implementations, primary processing system 1002 may have various devices 1060 connected to it for data collection. For example, devices 1060 can include one or more cameras 1062. For example, cameras 1062 can include digital (e.g., CMOS image sensor) or analog (e.g. film) photographic imaging devices. Cameras 1062 can include, for example, a video cameras, an infra-red camera, and/or a multispectral camera. Devices 1060 can include payload device 1064. For example, payload device 1064 can be a mission-specific device used by primary processing system 1002 to collect mission-specific data and information for performing mission-specific tasks, such as collecting data needed to perform the processes and functions described above with reference to FIGS. 1-9.

In some implementations, devices 1060 can include additional sensors or electronic systems, such as Lidar, radio transceivers, sonar, and/or a traffic collision avoidance system (TCAS), video camera, infra-red camera, multispectral camera, stereo camera pair, Lidar, radio transceiver, sonar, laser ranger, altimeter, ADS-B (Automatic dependent surveillance-broadcast) transponder, etc.

In some implementations, primary processing system 1002 can interact with devices 1060 through controllers 1066. For example, controllers 1066 may be used to interact with and/or operate camera 1062 and/or payload device 1064. Data collected by devices 1060 may be stored on the device collecting the data (e.g., in camera 1062, in payload device 1064, etc.), or the data may be stored on non-volatile memory 1020 of primary processing system 1002.

In some implementations, primary processing system 1002 may be coupled to communication subsystem 1070. For example, communication subsystem 1070 can include a global navigational satellite system (GNSS, GPS, etc.) receiver 1072 for receiving satellite signals used by primary processing system 1002 to determine the current location of the UAV.

In some implementations, communication subsystem 1070 can include radio transceiver 1074. For example, a UAV ground station (e.g., stationary or mobile) can send command and control signals to the UAV using radio transmissions to manually control the UAV. The UAV can receive the command and control signals using radio transceiver 1074. In some implementations, radio transceiver 1074 can be used for wireless or wired data transmission to and from the UAV primary processing system 1002, and optionally the UAV secondary processing system 1002.

In some implementations, the UAV may use one or more communications subsystems 1070, such as a wireless communication or wired subsystem, to facilitate communication to and from the UAV. Wireless communication subsystems 1070 may include radio transceivers, and infrared, optical ultrasonic, electromagnetic devices. Wired communication systems 1070 may include ports such as Ethernet, USB ports, serial ports, or other types of port to establish a wired connection to the UAV with other devices, such as a ground control system, flight planning system, or other devices, for example a mobile phone, tablet, personal computer, display monitor, other network-enabled devices. The UAV may use a light-weight tethered wire to a ground control station for communication with the UAV. The tethered wire may be removeably affixed to the UAV, for example via a magnetic coupler.

In some implementations, flight data logs may be generated by obtaining various information from the UAV sensors 1050, devices 1060, communication subsystems 1070, operating system 1022 and/or other components of UAV system architecture 1000 and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the flight planning system.

In addition to the UAV primary processing system 1002, a secondary processing system 1082 may be used to run a secondary computing environment 1080 within the UAV for performing other processes or functions, such as the process and functions for dynamically adjusting UAV flight operations based on thermal sensor data, as described above with reference to FIGS. 1-9. For example, typically flight critical functions of the UAV will be performed using primary processing system 1002, while mission specific, secondary, or auxiliary functions of the UAV may be performed using secondary processing system 1082. Further, even though secondary processing system 1082 operates in secondary computing environment 1080, secondary processing system 1082 may be able to access memory 1020, sensors 1050, devices 1060, and/or communication subsystem 1070 (e.g., through primary processing system 1002) in order to perform various processes and/or functions, such as the process and functions for dynamically adjusting UAV flight operations based on thermal sensor data, as described above with reference to FIGS. 1-9.

In some implementations, UAV secondary processing system 1082 can be a system of one or more computers, or software executing on a system of one or more computers, which is in communication with, or maintains, one or more databases. The UAV secondary processing system 1082 can include one or more processors 1084, graphics processors 1086, and/or I/O subsystem 1088. In some implementations, secondary processing system 1082 can include other or additional components, such as logic circuits, analog circuits, associated volatile and/or non-volatile memory, associated input/output data ports, power ports, etc. Secondary processing system 1082 can include one or more software processes, modules, instructions executing on processors 1084, GPU 1086, and/or other components of secondary processing system 1082.

In some implementations, secondary processing system 1082 can be coupled to memory 1090 in secondary computing environment 1080. For example, memory 1090 may include non-volatile memory, such as one or more magnetic disk storage devices, solid state hard drives, flash memory. Memory 1090 may include volatile memory such a RAM, DRAM, SRAM that may be used for storage of data, applications, instructions, etc., while the UAV is operational. Ideally modules, applications and other functions running on the secondary processing system 1082 will be non-critical functions in nature, that is, if the function fails, the UAV will still be able to safely operate.

In some implementations, memory 1090 can include operating system 1092. For example, operating system 1092 can be a real time operating system (RTOS), UNIX, LINUX, OS X, WINDOWS, ANDROID or other operating system. Operating system 1092 may include instructions for handling basic system services and for performing hardware dependent tasks. However, in some implementations, operating system 1092 may include instructions for handling the processes and functions as described above with reference to FIGS. 1-9.

In some implementations, memory 1090 can include other software modules 1094. For example, other software modules 1094 and/or applications may be run by secondary processing system 1082 in secondary computing environment 1080, such as software modules and/or application for performing the processes and functions described above with reference to FIGS. 1-9.

FIG. 13A and FIG. 13B show example system architectures 1300 and 1350 for the computing devices performing the various operations, processes, and functions described herein. The more appropriate embodiment will be apparent to those of ordinary skill in the art when practicing the present technology. For example, system architectures 1300 and/or 1350 can correspond to flight planning system 102, user device 140, and/or ground control system 150, described above with reference to FIG. 1. System architectures 1300 and/or 1350 may be incorporated into system architecture 1000 to enable the various operations, processes, functions and features of UAV 160. Persons of ordinary skill in the art will also readily appreciate that other system embodiments are possible.

FIG. 13A illustrates a conventional system bus computing system architecture 1300 wherein the components of the system are in electrical communication with each other using a bus 1305. Example system 1300 includes a processing unit (CPU or processor) 1310 and a system bus 1305 that couples various system components including the system memory 1315, such as read only memory (ROM) 1320 and random access memory (RAM) 1325, to the processor 1310. The system 1300 can include a cache of high-speed memory connected directly with, in close proximity to, or integrated as part of the processor 1310. The system 1300 can copy data from the memory 1315 and/or the storage device 1330 to the cache 1312 for quick access by the processor 1310. In this way, the cache can provide a performance boost that avoids processor 1310 delays while waiting for data. These and other modules can control or be configured to control the processor 1310 to perform various actions. Other system memory 1315 may be available for use as well. The memory 1315 can include multiple different types of memory with different performance characteristics. The processor 1310 can include any general purpose processor and a hardware module or software module, such as module 1 1332, module 2 1334, and module 3 1336 stored in storage device 1330, configured to control the processor 1310 as well as a special-purpose processor where software instructions are incorporated into the actual processor design. The processor 1310 may essentially be a completely self-contained computing system, containing multiple cores or processors, a bus, memory controller, cache, etc. A multi-core processor may be symmetric or asymmetric.

To enable user interaction with the computing device 1300, an input device 1345 can represent any number of input mechanisms, such as a microphone for speech, a touch-sensitive screen for gesture or graphical input, keyboard, mouse, motion input, speech and so forth. An output device 1335 can also be one or more of a number of output mechanisms known to those of skill in the art. In some instances, multimodal systems can enable a user to provide multiple types of input to communicate with the computing device 1300. The communications interface 1340 can generally govern and manage the user input and system output. There is no restriction on operating on any particular hardware arrangement and therefore the basic features here may easily be substituted for improved hardware or firmware arrangements as they are developed.

Storage device 1330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof.

The storage device 1330 can include software modules 1332, 1334, 1336 for controlling the processor 1310. Other hardware or software modules are contemplated. The storage device 1330 can be connected to the system bus 1305. In one aspect, a hardware module that performs a particular function can include the software component stored in a computer-readable medium in connection with the necessary hardware components, such as the processor 1310, bus 1305, display 1335, and so forth, to carry out the function.

FIG. 13B illustrates a computer system 1350 having a chipset architecture that can be used in executing the described method and generating and displaying a graphical user interface (GUI). Computer system 1350 is an example of computer hardware, software, and firmware that can be used to implement the disclosed technology. System 1350 can include a processor 1310, representative of any number of physically and/or logically distinct resources capable of executing software, firmware, and hardware configured to perform identified computations. Processor 1310 can communicate with a chipset 1360 that can control input to and output from processor 1310. In this example, chipset 1360 outputs information to output 1365, such as a display, and can read and write information to storage device 1370, which can include magnetic media, and solid state media, for example. Chipset 1360 can also read data from and write data to RAM 1375. A bridge 1380 for interfacing with a variety of user interface components 1385 can be provided for interfacing with chipset 1360. Such user interface components 1385 can include a keyboard, a microphone, touch detection and processing circuitry, a pointing device, such as a mouse, and so on. In general, inputs to system 1350 can come from any of a variety of sources, machine generated and/or human generated.

Chipset 1360 can also interface with one or more communication interfaces 1390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1310 analyzing data stored in storage 1370 or 1375. Further, the machine can receive inputs from a user via user interface components 1385 and execute appropriate functions, such as browsing functions by interpreting these inputs using processor 1310.

It can be appreciated that example systems 1300 and 1350 can have more than one processor 1310 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Each of the processes, methods, and algorithms described in the preceding sections may be embodied in, and fully or partially automated by, code modules executed by one or more computer systems or computer processors comprising computer hardware. The code modules may be stored on any type of, one or more, non-transitory computer-readable media (e.g., a computer storage product) or computer storage devices, such as hard drives, solid state memory, optical disc, and/or the like. The systems and modules may also be transmitted as generated data signals (for example, as part of a carrier wave or other analog or digital propagated signal)

on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the term "module", as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device, such as airspace reservation module 302, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart-phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a toolbar, a pop up menu, interactive voice response system, or otherwise.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    receiving a flight plan of an unmanned aerial vehicle (UAV) for inspecting a structure that includes an RF transmitter;
    surveying the structure based on the flight plan to collect RF signal data;
    generating an RF map associated with the structure based on the collected RF signal data;
    adjusting the flight plan based on the generated RF map to account for detected RF signal strengths by modifying a geofence for the UAV based on the detected RF signal strengths identified in the RF signal data; and
    navigating the UAV according to the adjusted flight plan.

2. The method of claim 1, further comprising:
    configuring the UAV to fly at a safe distance away from the structure to collect the RF signal data.

3. The method of claim 1, further comprising:
    capturing, while executing the adjusted flight plan, optical images of the RF transmitter.

4. The method of claim 1, further comprising:
    capturing, while executing the adjusted flight plan, RF signal mapping data.

5. The method of claim 1, further comprising:
    detecting, while navigating according to the adjusted flight plan, a contingency event.

6. The method of claim 5, wherein the contingency event is based on an RF signal strength that exceeds a threshold.

7. The method of claim 5, further comprising:
    in response to detecting the contingency event, performing a contingency maneuver to further adjust the adjusted flight plan.

8. The method of claim 7, wherein the contingency maneuver comprises at least one of reversing course, flying to a previous waypoint, or proceeding to an emergency landing location.

9. The method of claim 1, wherein the adjusted flight plan excludes waypoints that coincide with areas of high RF signal strength to ensure safety and an operational integrity of the UAV.

10. The method of claim 1, further comprising:
    transmitting, by the UAV and in real-time to a ground-based system, the collected RF signal data.

11. An Unmanned Aerial Vehicle (UAV), comprising:
    a processor configured to execute instructions to:
        receive a flight plan for inspecting a radio frequency (RF) transmitter;
        survey the RF transmitter to collect RF signal data;
        adjust the flight plan of the UAV by modifying a geofence for the UAV based on the detected RF signal strengths identified in the RF signal data; and
        navigate the UAV according to the adjusted flight plan.

12. The UAV of claim 11, wherein to survey the RF transmitter to collect RF signal data comprises to:
    perform a Received Signal Strength Indicator (RSSI) survey of the RF transmitter and surrounding areas.

13. The UAV of claim 12, wherein the flight plan is adjusted to account for detected variations in the RF signal data, and wherein the detected variations include RSSI values indicating differences in at least one of signal distribution, signal direction, or number of lobes than corresponding expected values.

14. The UAV of claim 11, wherein the processor is further configured to execute instructions to:
    adjust a flight path of the UAV based on an RSSI value that is detected while navigating the UAV according to the adjusted flight plan.

15. A non-transitory computer readable medium storing instructions operable to cause one or more processors to perform operations to adjust a flight plan of an Unmanned Aerial Vehicle (UAV) based on radio frequency (RF) signal data, the operations to:
    receive the flight plan for inspecting an RF transmitter;
    survey the RF transmitter to collect RF signal data;
    adjust the flight plan by adding a geofence for the UAV based on detected RF signal strengths identified in the RF signal data; and
    navigate the UAV according to the adjusted flight plan.

16. The non-transitory computer readable medium of claim 15, wherein the operations further comprise to:
    detect, while navigating the UAV according to the adjusted flight plan, that a real-time RSSI value exceeds a safe operating threshold of the UAV; and
    adjust a flight path of the UAV based on a detected real-time RSSI value.

17. The non-transitory computer readable medium of claim 15, wherein the operations further comprise to:
    capture, while executing the adjusted flight plan, RF signal mapping data.

18. The non-transitory computer readable medium of claim 15, wherein the operations further comprise to:
    detect, while navigating according to the adjusted flight plan, a contingency event that is based on the UAV entering a restricted airspace.

* * * * *